(12) United States Patent
Maeyama et al.

(10) Patent No.: US 11,841,999 B2
(45) Date of Patent: *Dec. 12, 2023

(54) PEN STATE DETECTION CIRCUIT, SYSTEM, AND METHOD

(71) Applicant: Wacom Co., Ltd., Saitama (JP)

(72) Inventors: Koichi Maeyama, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,084

(22) Filed: Jan. 4, 2023

(65) Prior Publication Data

US 2023/0146504 A1 May 11, 2023

Related U.S. Application Data

(63) Continuation of application No. 17/406,717, filed on Aug. 19, 2021, now Pat. No. 11,604,521, which is a
(Continued)

(30) Foreign Application Priority Data

Mar. 29, 2019 (WO) .................. PCT/JP2019/014260

(51) Int. Cl.
*G06F 3/0354* (2013.01)
*G06F 3/044* (2006.01)
*G06F 3/041* (2006.01)

(52) U.S. Cl.
CPC ........ *G06F 3/03545* (2013.01); *G06F 3/0418* (2013.01); *G06F 3/0442* (2019.05); *G06F 3/0446* (2019.05); *G06F 2203/04106* (2013.01)

(58) Field of Classification Search
CPC .. G06F 3/03545; G06F 3/0442; G06F 3/0446; G06F 3/0418; G06F 2203/04106
See application file for complete search history.

(56) References Cited

U.S. PATENT DOCUMENTS

2002/0032670 A1    3/2002  Watanabe et al.
2014/0379287 A1   12/2014  Luong
(Continued)

FOREIGN PATENT DOCUMENTS

CN    106201049 A    12/2016
JP     8-212184 A     8/1996
(Continued)

OTHER PUBLICATIONS

International Search Report, dated Apr. 7, 2020, for International Application No. PCT/JP2020/002615, 3 pages.
(Continued)

*Primary Examiner* — Michael Pervan
(74) *Attorney, Agent, or Firm* — Seed IP Law Group LLP

(57) ABSTRACT

Provided are a pen state detection circuit, a pen state detection system, and a pen state detection method that can improve estimation accuracy for a pen state in an electronic pen including at least one electrode. A pen state detection circuit acquires, from a touch sensor, a first signal distribution indicating a change in capacitance associated with approach of a first electrode and uses a machine learning estimator to estimate an instruction position or an inclination angle of an electronic pen from first feature values related to the first signal distribution. The first feature values include first local feature values related to a first local distribution corresponding to sensor electrodes in a number fewer than the number of arranged sensor electrodes exhibiting the first signal distribution.

18 Claims, 30 Drawing Sheets

Related U.S. Application Data continuation of application No. PCT/JP2020/002615, filed on Jan. 24, 2020.

(56) References Cited

U.S. PATENT DOCUMENTS

| | | |
|---|---|---|
| 2015/0116279 A1 | 4/2015 | Ohba et al. |
| 2016/0077611 A1 | 3/2016 | Katsurahira et al. |
| 2018/0129310 A1 | 5/2018 | Haran et al. |
| 2018/0129314 A1 | 5/2018 | Yamada et al. |
| 2018/0196574 A1 | 7/2018 | Case, Jr. et al. |
| 2020/0159386 A1 | 5/2020 | Saito et al. |

FOREIGN PATENT DOCUMENTS

| | | |
|---|---|---|
| JP | 2002-117389 A | 4/2002 |
| JP | 2015-510210 A | 4/2015 |
| JP | 2015-87785 A | 5/2015 |
| JP | 2016-62217 A | 4/2016 |
| WO | 2018/083872 A1 | 5/2018 |
| WO | 2018/105028 A1 | 6/2018 |
| WO | 2019/013222 A1 | 1/2019 |

OTHER PUBLICATIONS

Chinese Office Action dated Sep. 14, 2023, for the corresponding Chinese Patent Application No. 202080011509.X, 28 pages. (With English Translation).

28D

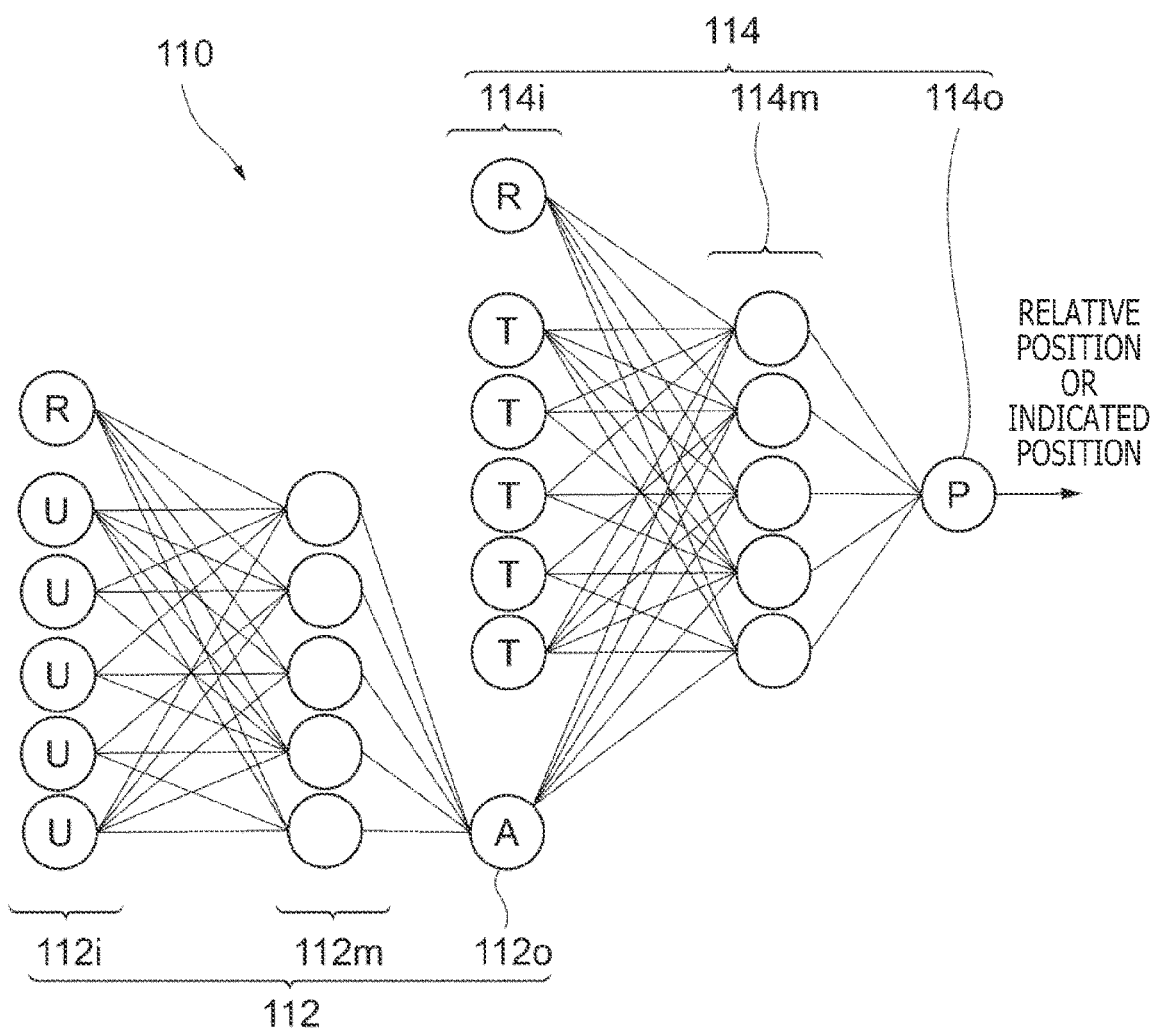

28G

28H

FIG.27A (REFERENCE EXAMPLE)
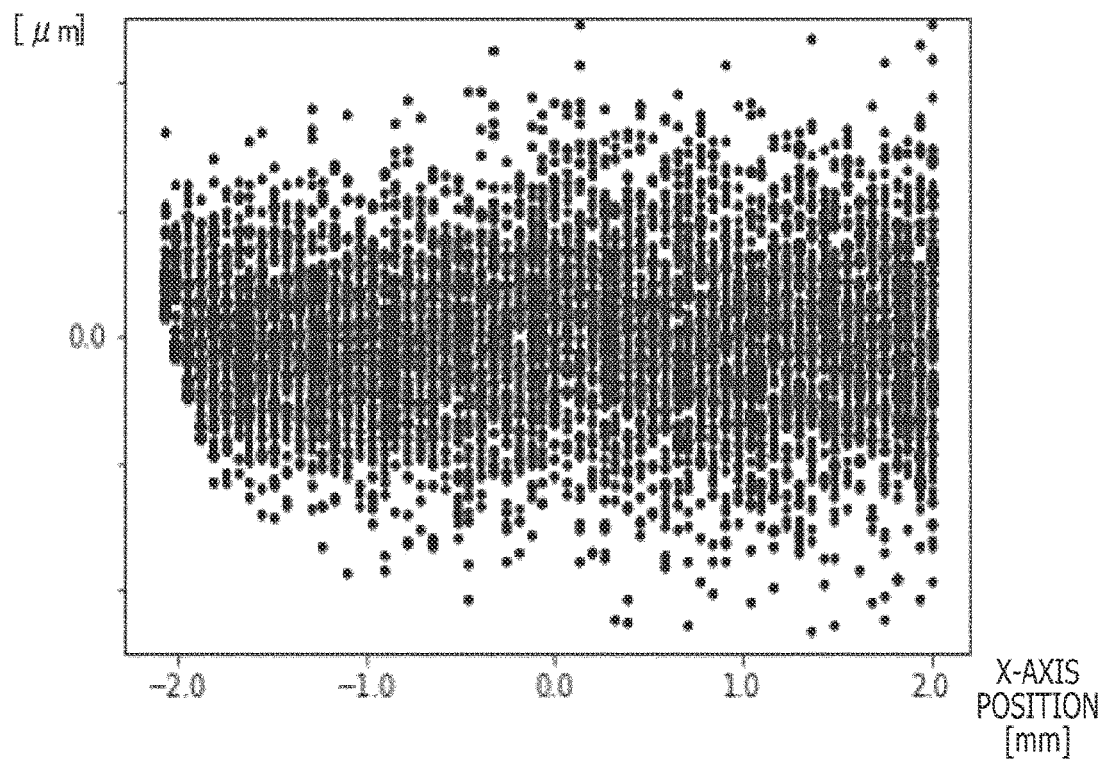
FIG.27B (EMBODIMENTS)
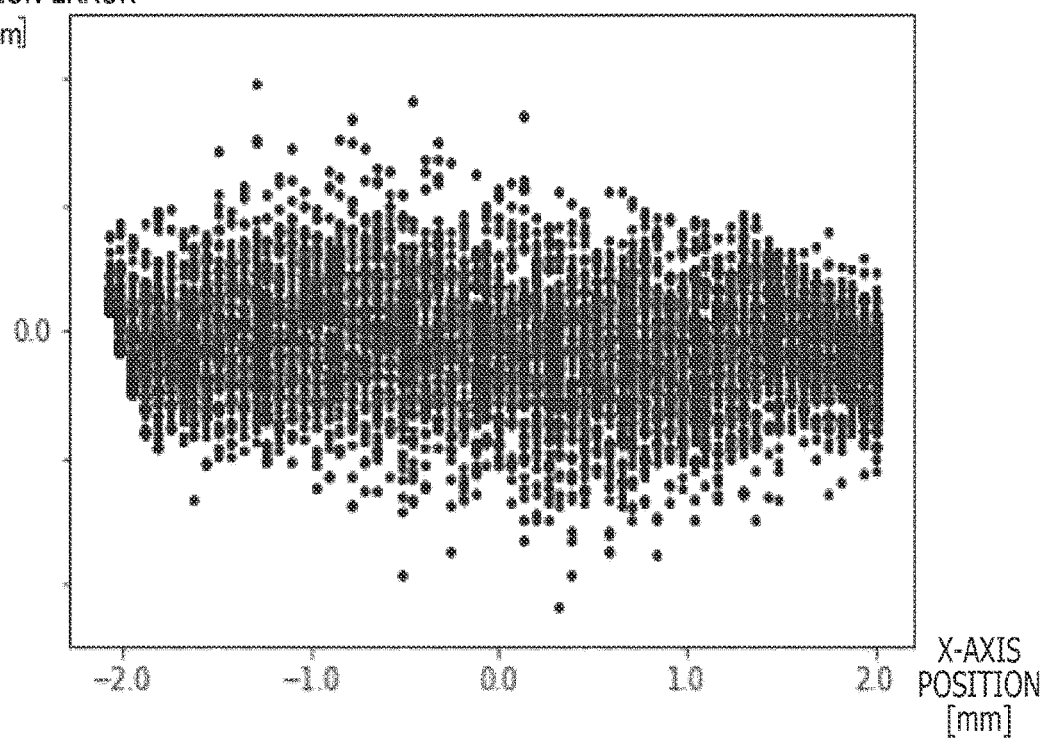

FIG.28
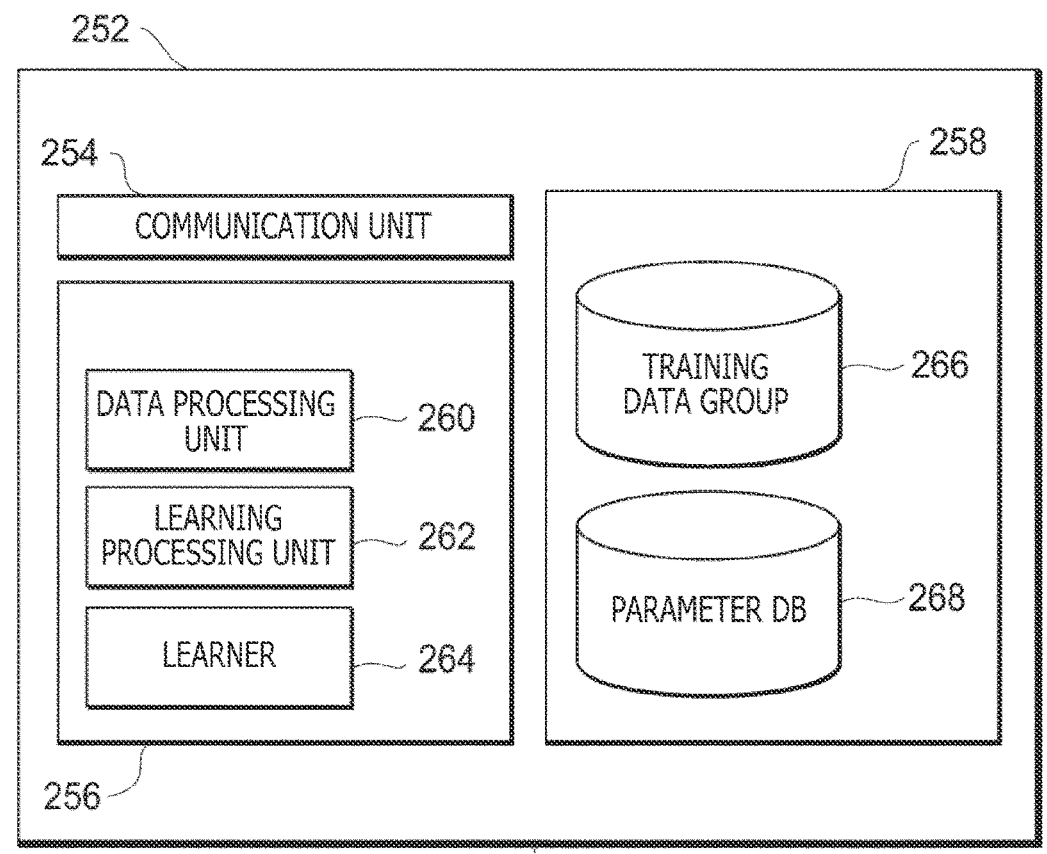
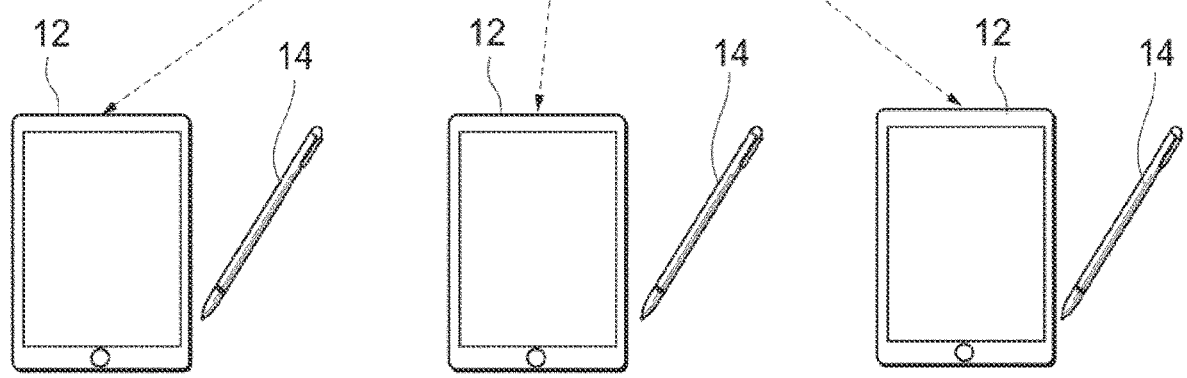

FIG.31
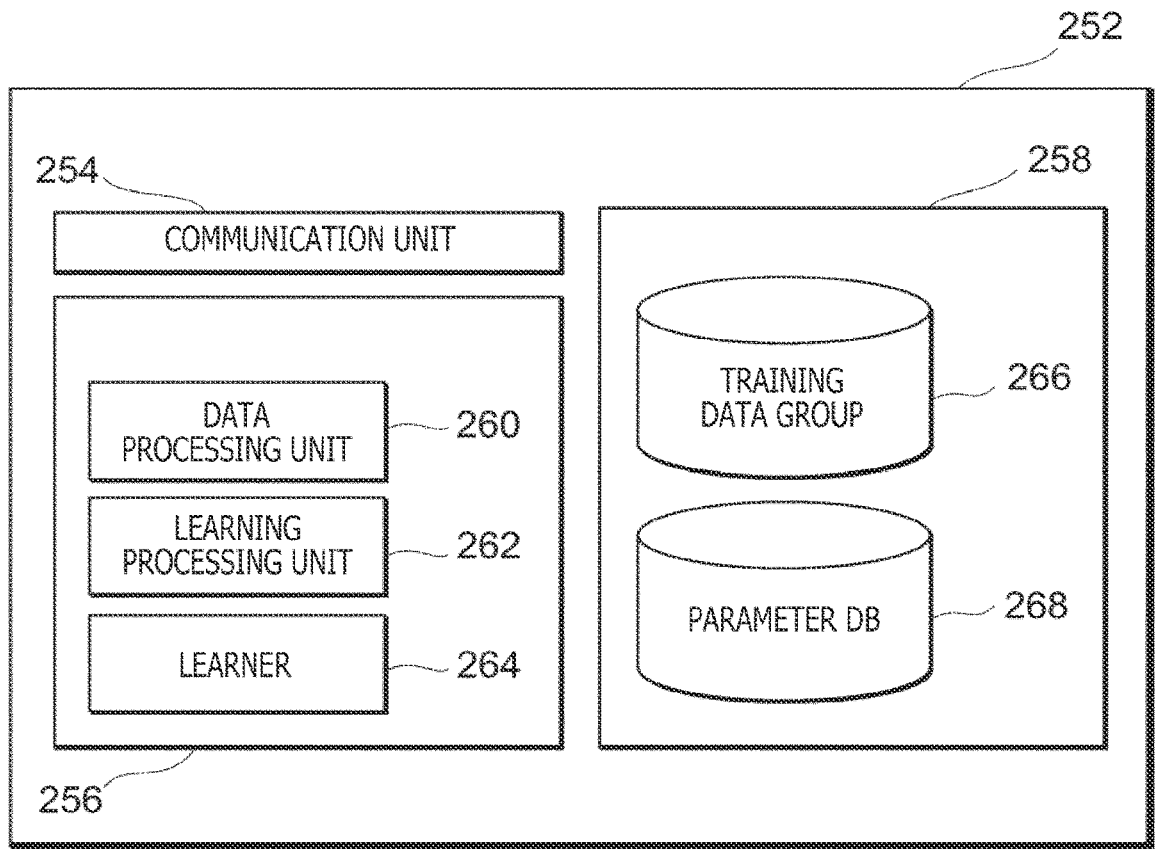
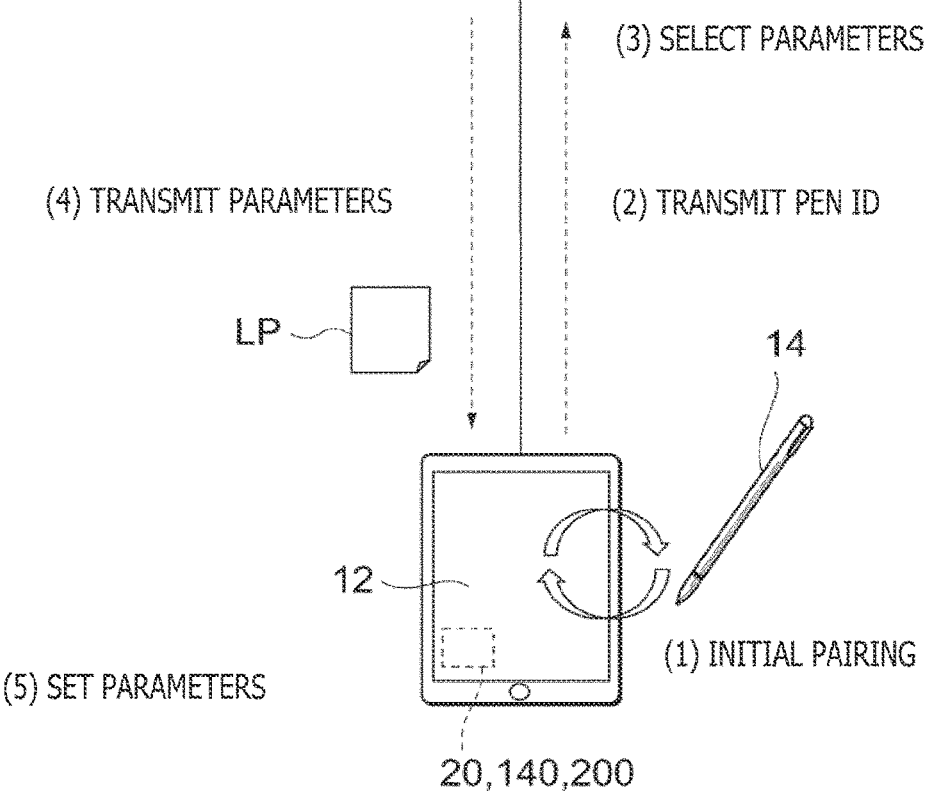

PEN STATE DETECTION CIRCUIT, SYSTEM, AND METHOD

BACKGROUND

Technical Field

The present disclosure relates to a pen state detection circuit, a pen state detection system, and a pen state detection method.

Description of the Related Art

An electronic device is disclosed in Patent Document 1. The electronic device detects a first position where a hand of a user comes into contact with a detection surface of a touch sensor and a second position indicated by an electronic pen, uses coordinate values of the first position and the second position to estimate an inclination direction of the electronic pen, and corrects an instruction position of the electronic pen according to the inclination direction.

PRIOR ART DOCUMENT

Patent Document

Patent Document 1: Japanese Patent Laid-Open No. 2015-087785

BRIEF SUMMARY

Technical Problem

Incidentally, an electronic pen including two electrodes can be used to estimate the position and the posture of the electronic pen even when the hand of the user is not touching the detection surface. However, the two electrodes are physically separated, and thus, at least one electrode always does not come into contact with the detection surface when the electronic pen is being used. In this case, the relation between the inclination angle and the detection position of the electronic pen may change according to the three-dimensional shapes of the electrodes, and the estimation accuracy may vary depending on the position and the posture of the electronic pen.

An object of the present disclosure is to provide a pen state detection circuit, a pen state detection system, and a pen state detection method that can improve estimation accuracy for a pen state in an electronic pen including at least one electrode.

Technical Solution

A first present disclosure provides a pen state detection circuit that detects a state of an electronic pen including a first electrode, on the basis of a signal distribution detected by a capacitance touch sensor including a plurality of sensor electrodes arranged in a plane shape, the pen state detection circuit executing an acquisition step of acquiring, from the touch sensor, a first signal distribution indicating a change in capacitance associated with approach of the first electrode; and an estimation step of using a machine learning estimator to estimate an instruction position or an inclination angle of the electronic pen from first feature values related to the first signal distribution, in which the first feature values include first local feature values related to a first local distribution corresponding to sensor electrodes in a number fewer than the number of arranged sensor electrodes exhibiting the first signal distribution.

A second present disclosure provides a pen state detection system including an electronic device including the pen state detection circuit; an electronic pen used along with the electronic device; and a server apparatus that is configured to be capable of performing two-way communication with the electronic device and that storing learning parameter groups of an estimator constructed on the pen state detection circuit, in which the electronic device requests the server apparatus to transmit a learning parameter group corresponding to the electronic pen when the electronic pen is detected.

A third present disclosure provides a pen state detection method of detecting a state of an electronic pen including an electrode, on the basis of a signal distribution detected by a capacitance touch sensor including a plurality of sensor electrodes arranged in a plane shape, in which one or a plurality of processors execute an acquisition step of acquiring, from the touch sensor, a signal distribution indicating a change in capacitance associated with approach of the electrode; and an estimation step of using a machine learning estimator to estimate an instruction position or an inclination angle of the electronic pen from feature values related to the signal distribution, and the feature values include local feature values related to a local distribution corresponding to sensor electrodes in a number fewer than the number of arranged sensor electrodes exhibiting the signal distribution.

A fourth present disclosure provides a pen state detection circuit that detects a state of an electronic pen including an electrode, on the basis of a signal distribution detected by a capacitance touch sensor including a plurality of sensor electrodes arranged in a plane shape, the pen state detection circuit executing an acquisition step of acquiring, from the touch sensor, a signal distribution indicating a change in capacitance associated with approach of the electrode; and an estimation step of estimating an instruction position or an inclination angle of the electronic pen from feature values related to the signal distribution by following different computation rules according to a projection position of the electrode on a detection surface of the touch sensor.

A fifth present disclosure provides a pen state detection system including an electronic device including the pen state detection circuit; an electronic pen used along with the electronic device; and a server apparatus that is configured to be capable of performing two-way communication with the electronic device and storing learning parameter groups of an estimator constructed on the pen state detection circuit, in which the electronic device requests the server apparatus to transmit a learning parameter group corresponding to the electronic pen when the electronic pen is detected.

A sixth present disclosure provides a pen state detection method of detecting a state of an electronic pen including an electrode, on the basis of a signal distribution detected by a capacitance touch sensor including a plurality of sensor electrodes arranged in a plane shape, in which one or a plurality of processors execute an acquisition step of acquiring, from the touch sensor, a signal distribution indicating a change in capacitance associated with approach of the electrode; and an estimation step of estimating an instruction position or an inclination angle of the electronic pen from feature values related to the signal distribution by following different computation rules according to a projection position of the electrode on a detection surface of the touch sensor.

Advantageous Effects

According to the first to third present disclosures, the machine learning estimator can be used to extract potential detection patterns through machine learning, and this facilitates appropriate reflection of the tendency of the detection patterns in estimating the instruction position or the inclination angle. Thus, the pen state of the electronic pen including at least one electrode can be estimated with high accuracy. In addition, the local feature values related to the local distribution corresponding to the sensor electrodes in a number fewer than the number of arranged sensor electrodes exhibiting the signal distribution can be used to reduce the processing load of the estimator to which the local feature values are input.

According to the fourth to sixth present disclosures, an estimate suitable for the projection position can be made by application of different computation rules according to the projection position of the electrode included in the electrode pen, and this suppresses the reduction in the estimation accuracy for the pen state caused by the relative positional relation between the electronic pen and the touch sensor. Therefore, the pen state of the electronic pen including at least one electrode can be estimated with high accuracy.

BRIEF DESCRIPTION OF THE SEVERAL VIEWS OF THE DRAWINGS

FIG. 15 is a diagram illustrating a configuration of an estimator included in a pen detection function according to a fourth modification of the first embodiment.

FIG. 27A is a diagram illustrating estimation accuracy for the instruction position according to a reference example. FIG. 27B is a diagram illustrating estimation accuracy for the instruction position according to the embodiments.

FIG. 28 is an overall configuration diagram of an input system as a pen state detection system according to a fourth embodiment.

FIG. 31 is a diagram illustrating a second example of the setting method of the learning parameter group.

DETAILED DESCRIPTION

Figure 1:
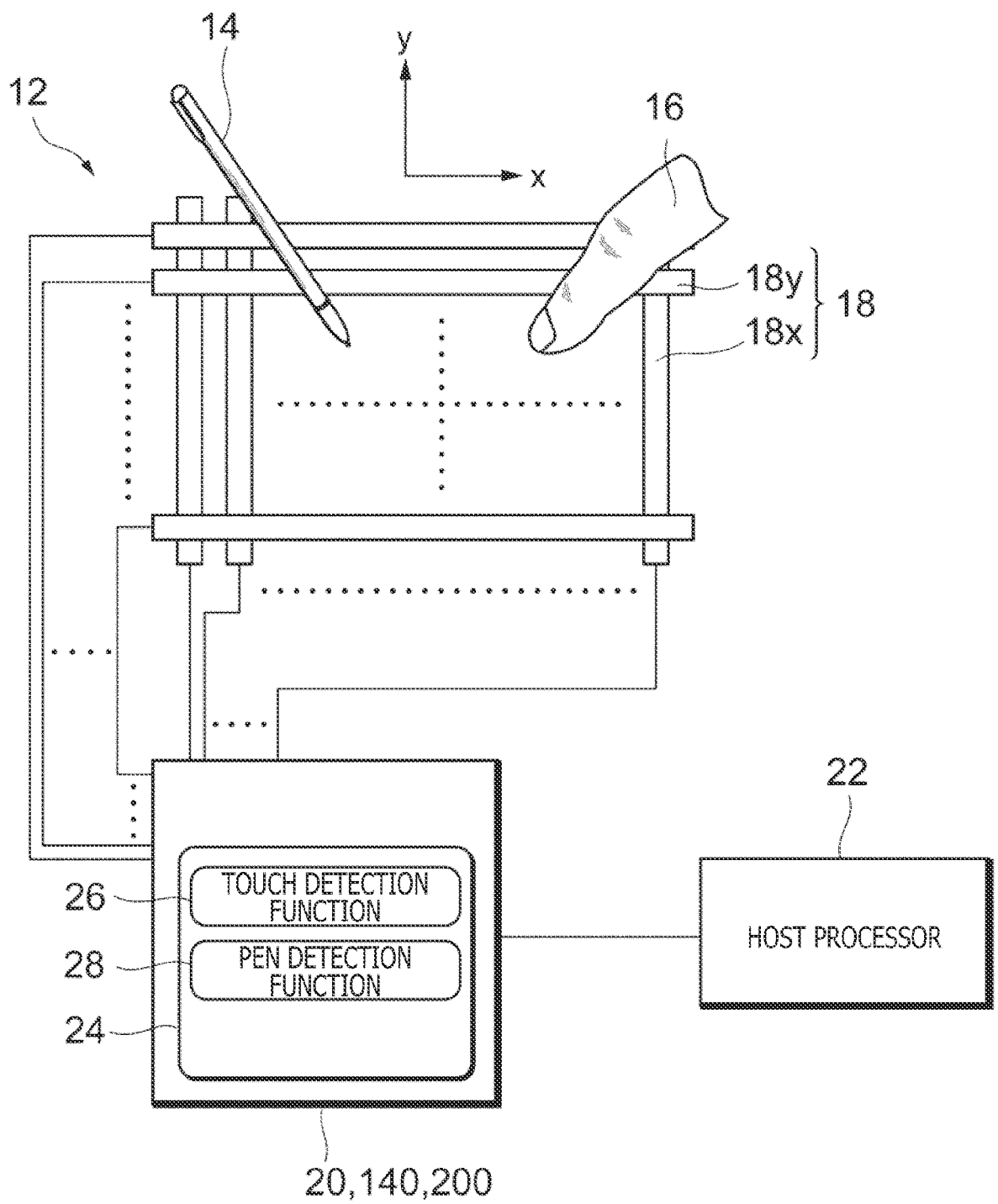
FIG. 1 is an overall configuration diagram of an input system common to embodiments of the present disclosure.

A pen state detection circuit, a pen state detection system, and a pen state detection method according to the present disclosure will be described with reference to the attached drawings. To facilitate the understanding of the description, the same reference signs are provided as much as possible to the same constituent elements and steps in the drawings, and the description may not be repeated. Note that the present disclosure is not limited to the following embodiments and modifications, and it is obvious that the present disclosure can freely be changed without departing from the scope of the disclosure. Alternatively, the configurations may be combined optionally as long as there is no technical contradiction.

Configuration Common to Embodiments

Overall Configuration of Input System 10

FIG. 1 is an overall configuration diagram of an input system 10 common to the embodiments of the present disclosure. The input system 10 basically includes an electronic device 12 including a touch panel display; and an electronic pen 14 (or, also referred to as a "stylus") that is a pen-type pointing device.

The electronic device 12 includes, for example, a tablet terminal, a smartphone, and a personal computer. The user can hold the electronic pen 14 with one hand and move the electronic pen 14 while pressing the pen tip against the touch surface of the electronic device 12 to thereby depict pictures and write letters on the electronic device 12. In addition, the user can touch the touch surface with a finger 16 of the user to perform a desired operation through a user controller being displayed.

The electronic device 12 includes a touch sensor 18, a touch IC (Integrated Circuit) 20, and a host processor 22. An x-direction and a y-direction illustrated in FIG. 1 correspond to an X-axis and a Y-axis of a Cartesian coordinate system (hereinafter, sensor coordinate system) defined on the detection surface of the touch sensor 18.

The touch sensor 18 is a planar sensor including a plurality of electrodes arranged on a display panel not illustrated. The touch sensor 18 includes a plurality of line electrodes 18x for detecting an X-coordinate (position in the x-direction) and a plurality of line electrodes 18y for detecting a Y-coordinate (position in the y-direction). The plurality of line electrodes 18x are extended in the y-direction and arranged at equal intervals in the x-direction. The plurality of line electrodes 18y are extended in the x-direction and arranged at equal intervals in the y-direction. Hereinafter, the arrangement interval of the line electrodes 18x (or line electrodes 18y) will be referred to as a "pitch" in some cases. Note that the touch sensor 18 may be a self-capacitance sensor including block-like electrodes arranged in a two-dimensional grid, instead of the mutual capacitance sensor.

The touch IC 20 is an integrated circuit that can execute firmware 24 and is connected to each of the plurality of line electrodes 18x and 18y included in the touch sensor 18. The firmware 24 can realize a touch detection function 26 of detecting a touch of the finger 16 of the user or the like and a pen detection function 28 of detecting the state of the electronic pen 14.

The touch detection function 26 includes, for example, a scan function of the touch sensor 18, a creation function of a heat map (two-dimensional distribution of a detection level) on the touch sensor 18 and an area classification function (for example, classification of the finger 16 and palm) on the heat map. The pen detection function 28 includes, for example, a scan function (global scan or local scan) of the touch sensor 18, a reception and analysis function of a downlink signal, an estimation function of the state (for example, position, posture, and pen pressure) of the electronic pen 14, and a generation and transmission function of an uplink signal including a command for the electronic pen 14.

The host processor 22 is a processor including a CPU (Central Processing Unit) or a GPU (Graphics Processing Unit). The host processor 22 reads programs from a memory not illustrated and executes the programs to thereby perform, for example, a process of using data from the touch IC 20 to generate digital ink, a visualization process for displaying drawing content indicated by the digital ink, and the like.

Estimation Method for Pen State

Figure 2:
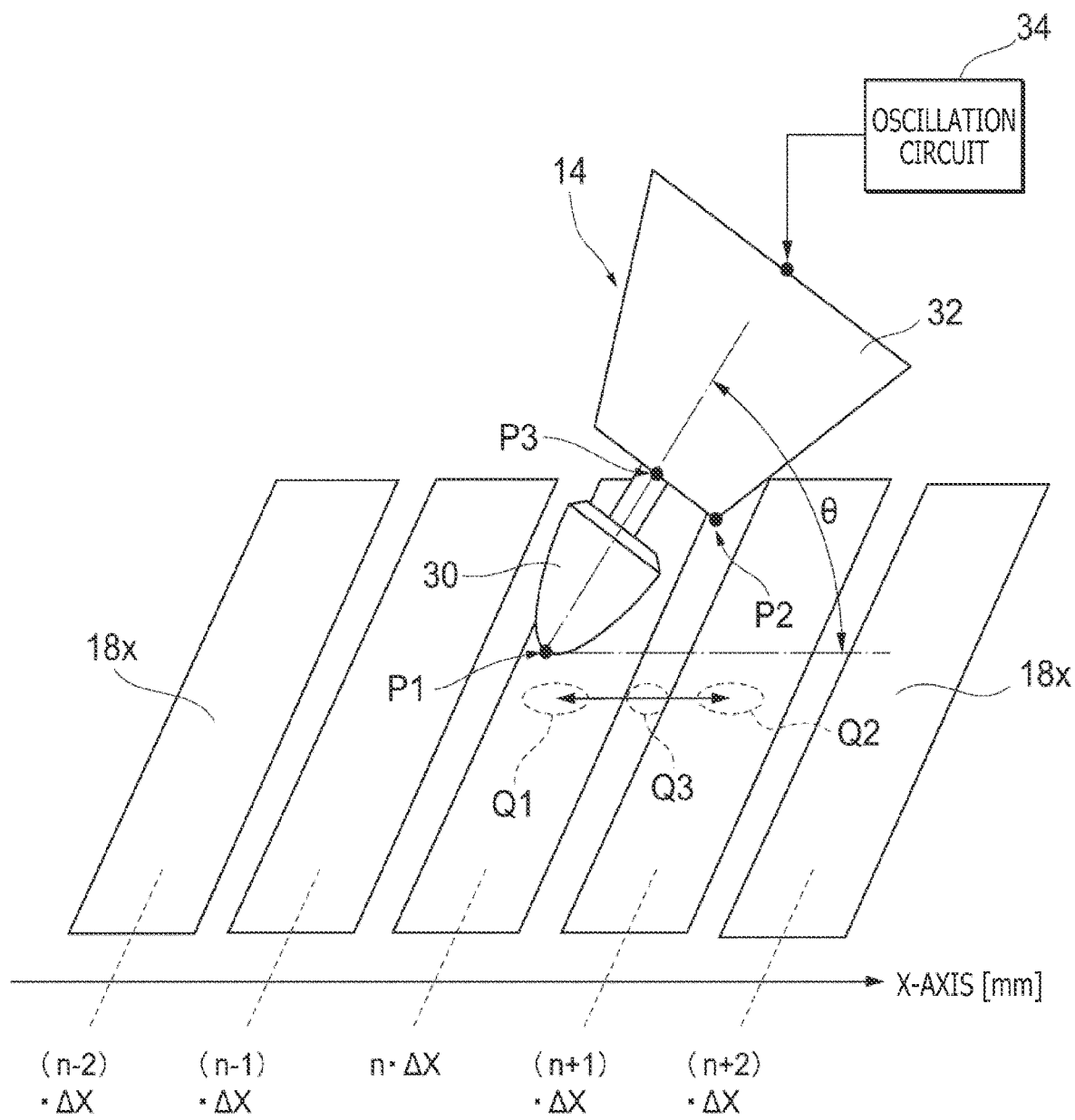
FIG. 2 is a schematic diagram partially illustrating an electronic pen of FIG. 1.

FIG. 2 is a schematic diagram partially illustrating the electronic pen 14 of FIG. 1. A tip electrode 30 in a substantially conical shape and an upper electrode 32 in a bottomless truncated conical shape are coaxially provided at the tip of the electronic pen 14. Each of the tip electrode 30 and the upper electrode 32 is an electrode for outputting a signal (what is generally called a downlink signal) generated by an oscillation circuit 34. The oscillation circuit 34 changes the oscillation frequency or switches the destination in time series, and this allows the electronic pen 14 to output two types of downlink signals through the tip electrode 30 and the upper electrode 32.

The touch IC 20 (FIG. 1) of the electronic device 12 acquires, from the touch sensor 18, a signal distribution (hereinafter, referred to as a "first signal distribution") indicating a change in capacitance (more specifically, mutual capacitance or self-capacitance) associated with approach of the tip electrode 30. The first signal distribution typically has a shape including one peak at a position Q1. Here, the position Q1 corresponds to a position of projection of the top (position P1) of the tip electrode 30 onto the sensor plane.

Similarly, the touch IC 20 (FIG. 1) of the electronic device 12 acquires, from the touch sensor 18, a signal distribution (hereinafter, referred to as a "second signal distribution") indicating a change in capacitance associated with approach of the upper electrode 32. The second signal distribution typically has a shape including one or two peaks at a position Q2. Here, the position Q2 corresponds to a position of projection of the shoulder (position P2) of the upper electrode 32 onto the sensor plane. In addition, a position Q3 described later corresponds to a position of projection of the center (position P3) of the upper bottom surface of the upper electrode 32 onto the sensor plane.

Figure 3A:
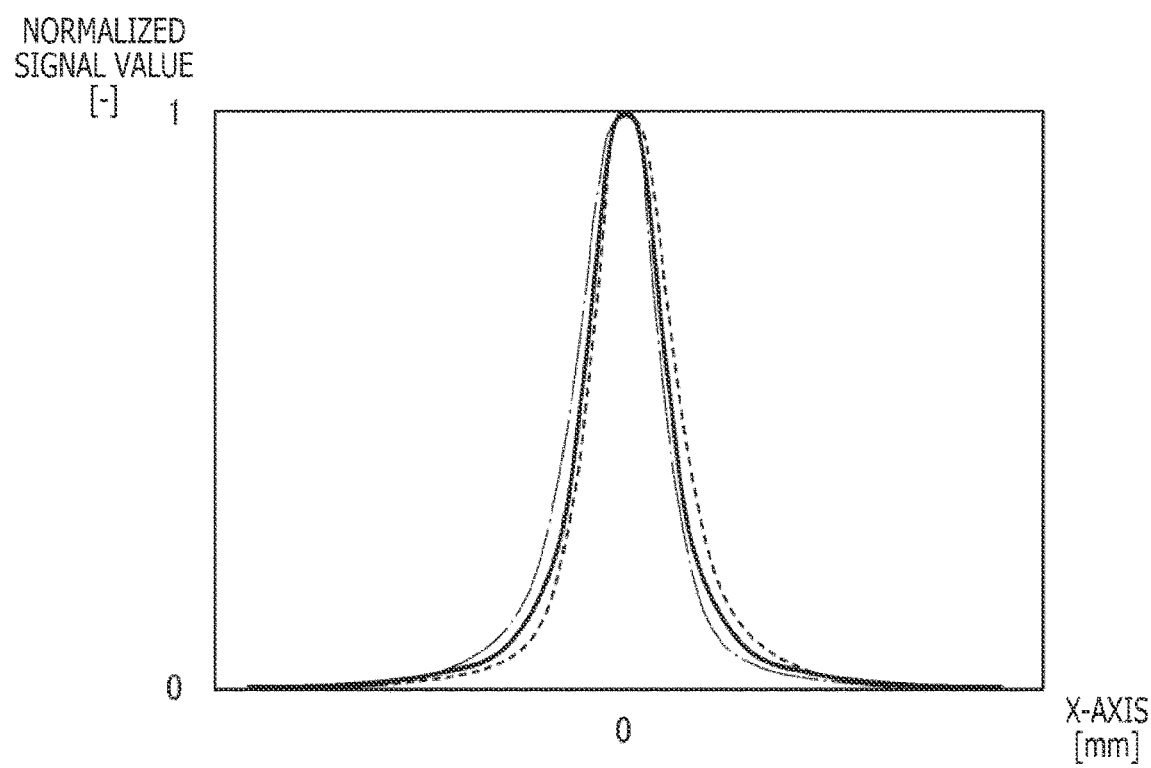
FIGS. 3A and 3B are diagrams illustrating an example of signal distributions detected by a touch sensor in a contact state of the electronic pen.
Figure 3B:
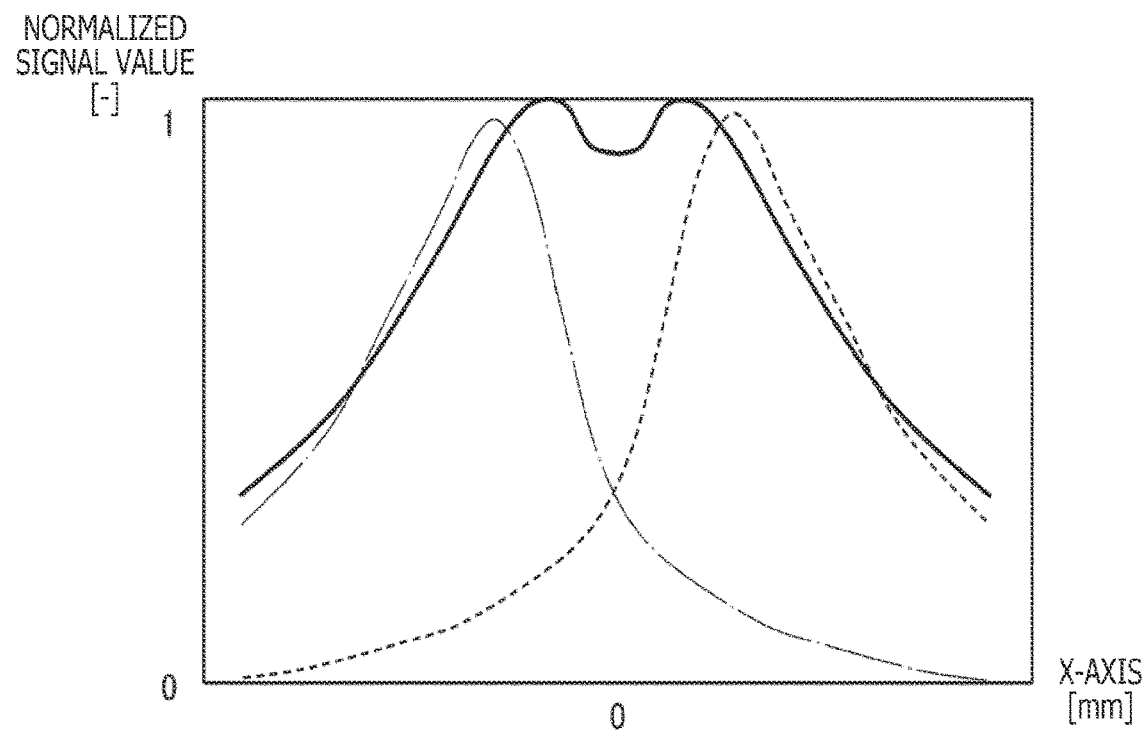

FIG. 3 depicts diagrams illustrating an example of the signal distributions detected by the touch sensor 18 in the contact state of the electronic pen 14. More specifically, FIG. 3A illustrates first signal distributions, and FIG. 3B illustrates second signal distributions. The horizontal axis of the graph represents relative positions (unit: mm) with respect to the instruction position of the electronic pen 14, and the vertical axis of the graph represents signal values (unit: none) normalized to [0, 1]. The plus and minus signs are defined such that the signal value is "positive" when the electronic pen 14 approaches. The shapes of the first and second signal distributions change according to the inclination angle of the electronic pen 14. In FIGS. 3A and 3B, three curves obtained by changing the inclination angle are displayed on top of each other.

As illustrated in FIG. 3A, the first signal distributions have substantially similar shapes regardless of the size of the inclination angle. This is because the top of the tip electrode 30 is usually at a position closest to the sensor plane, when the electronic pen 14 is being used, and the position Q1 substantially coincides with the position P1. On the other hand, as illustrated in FIG. 3B, the position or the number of peaks in the second signal distributions significantly varies according to the change in inclination angle. This is because part of the shoulder of the upper electrode 32 is usually at a position closest to the sensor plane, when the electronic pen 14 is being used, and the distance between the positions Q1 and Q2 varies according to the inclination angle.

The coordinates of the positions Q1 and Q2 can be used to estimate the position and the posture (hereinafter, also referred to as a pen state) of the electronic pen 14. For example, the instruction position corresponds to the position Q1 illustrated in FIG. 2. In addition, the inclination angle corresponds to an angle θ formed by the sensor plane and the axis of the electronic pen 14. More specifically, the angle θ is equal to 0° when the electronic pen 14 is parallel to the sensor plane, and the angle θ is equal to 90° when the electronic pen 14 is perpendicular to the sensor plane. Note that, other than the angle, the azimuth may be used as the physical quantity indicating the tilt state of the electronic pen 14, for example.

Figure 4:
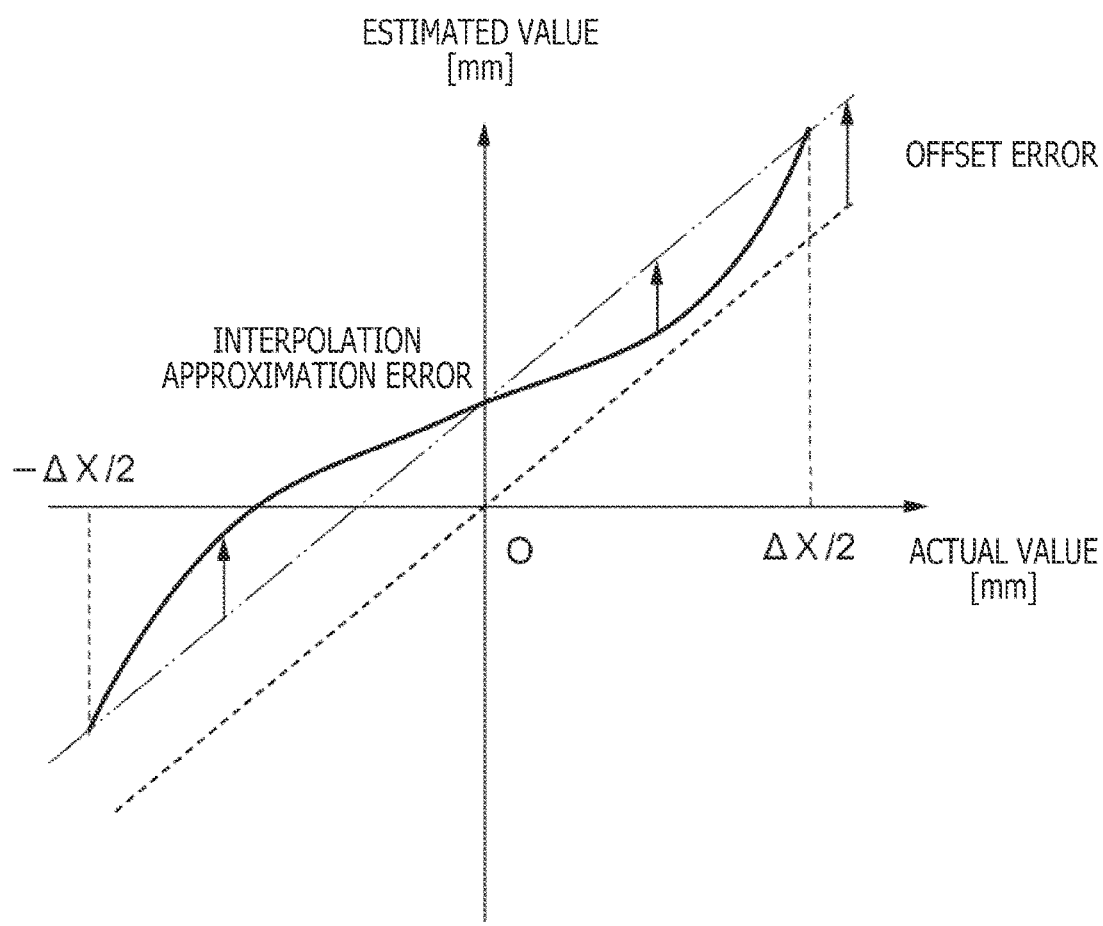
FIG. 4 is a diagram illustrating a tendency of an estimation error related to an instruction position.

FIG. 4 is a diagram illustrating a tendency of an estimation error related to the instruction position. The horizontal axis of the graph represents actual values (unit: mm) of the instruction position, and the vertical axis of the graph represents estimated values (unit: mm) of the instruction position. Here, the midpoint of the line electrode 18x in the width direction is defined as X=0 (mm). Note that, when the estimation error is 0, a straight line with a tilt of 1 passing through an origin O is obtained.

The signal distribution is, for example, a set of signal values sampled at equal intervals (pitch ΔX), and an interpolation operation is performed to more accurately estimate the peak of the signal distribution (that is, an instruction position). However, a fitting error occurs depending on the type of interpolation function, and periodical "interpolation approximation errors" occur in pitches.

In addition, when the inclination angle is estimated on the basis of the position P3 (see FIG. 2) of the upper electrode 32, the position Q2 coincides with the position Q3 where θ=0°, and there is no estimation error caused by the inclination angle. However, in a case where θ>0°, the estimated inclination angle is small due to the deviation of the positions Q2 and Q3. As a result, the obtained estimated value is shifted in the positive direction (that is, an inclination direction of the electronic pen 14), and what is generally called an "offset error" occurs.

In this way, when two electrodes at different positions and shapes are used to estimate the pen state, the estimation accuracy of the instruction position or the inclination angle may vary due to the interpolation approximation error and the offset error. Thus, a method that reduces these two types of errors at the same time to improve the estimation accuracy of the pen state is proposed.

First Embodiment

Hereinafter, a pen detection function 28A of the touch IC 20 according to a first embodiment will be described with reference to FIGS. 5 to 11.

Configuration and Operation

Figure 5:
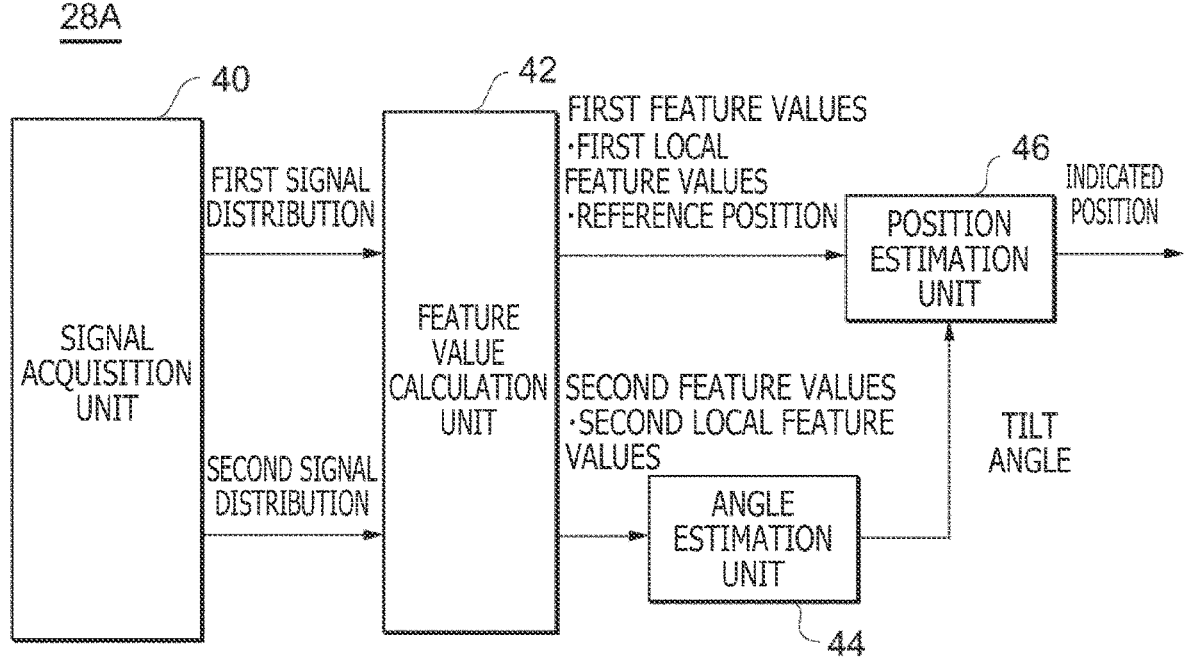
FIG. 5 is a block diagram illustrating a pen detection function according to a first embodiment.

FIG. 5 is a block diagram illustrating the pen detection function 28A according to the first embodiment. The pen detection function 28A includes a signal acquisition unit 40, a feature value calculation unit 42, an angle estimation unit 44, and a position estimation unit 46. Next, an operation of the touch IC 20 associated with execution of the pen detection function 28A will be described with reference to a flow chart of FIG. 6.

Figure 6:
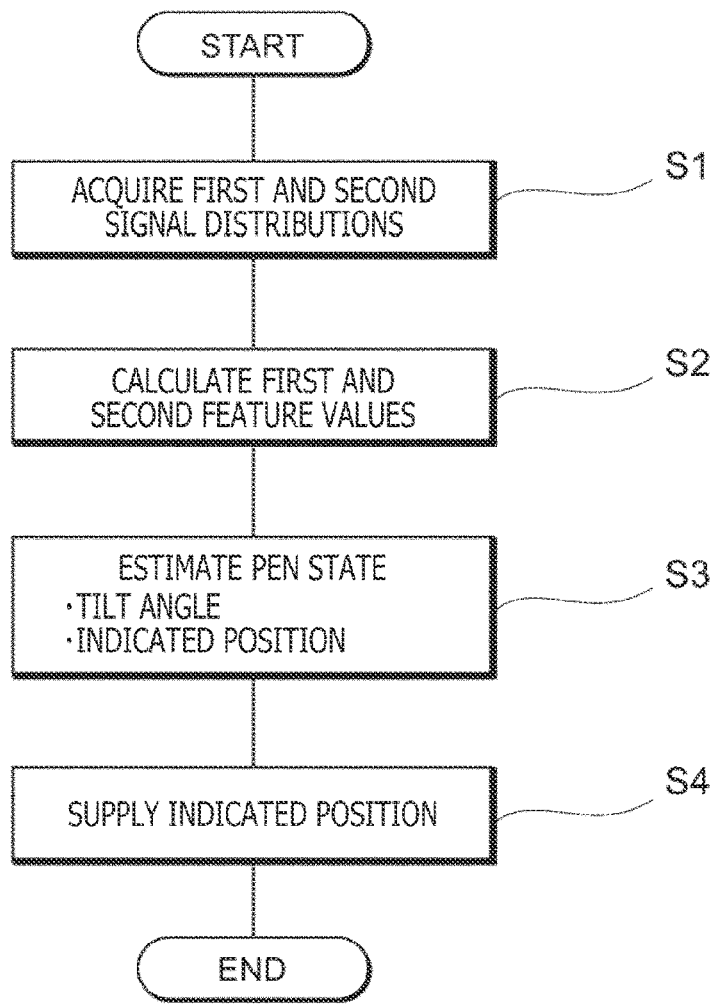
FIG. 6 is a flow chart executed by the pen detection function illustrated in FIG. 5.

In step S1 of FIG. 6, the signal acquisition unit 40 acquires, from the touch sensor 18, the first signal distribution and the second signal distribution through the scan operation of the line electrodes 18x and 18y. The signal distributions may be one-dimensional signal distributions along the X-axis or the Y-axis or may be two-dimensional signal distributions on the XY-axis plane. Here, an example of one-dimensional signal distributions along the X-axis will be described.

Figure 7:
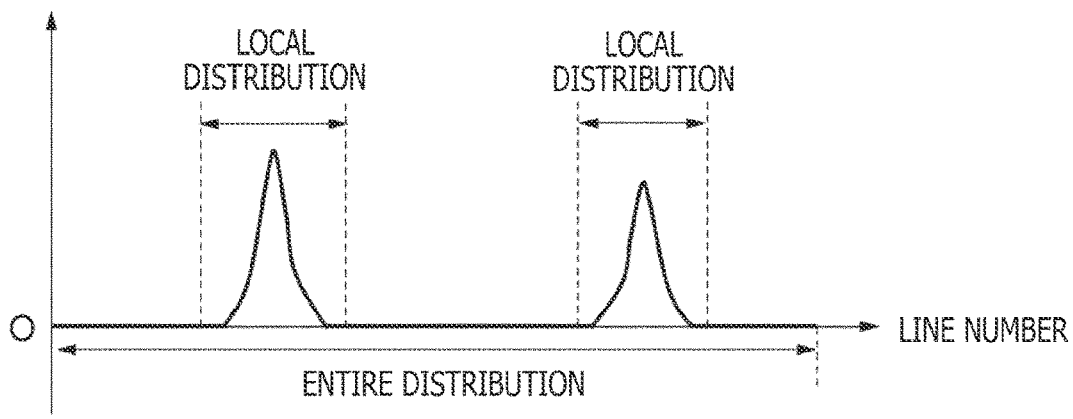
FIG. 7 is a diagram illustrating an example of signal distributions acquired from the touch sensor.

FIG. 7 is a diagram illustrating an example of signal distributions acquired from the touch sensor 18. The horizontal axis of the graph represents line numbers (that is, identification numbers of line electrodes 18x), and the vertical axis of the graph represents signal values. In the situation illustrated here, two electronic pens 14 are detected at the same time. In this case, two peaks with narrow widths are generated in the signal distributions, around the instruction positions of the electronic pens 14. On the other hand, the signal values are 0 or small values at remaining positions excluding the two peaks. Hereinafter, the entire signal distribution may be referred to as an "entire distribution," and a local signal distribution with a relatively large change in capacitance may be referred to as a "local distribution." Here, "relatively large" may be that the amount of change is larger than that at positions other than the local distribution or may be that the amount of change is larger than a predetermined threshold.

From another point of view, the "entire distribution" is a signal distribution corresponding to all of the arranged line electrodes 18x, and the "local distribution" is a signal distribution corresponding to part of the arranged line electrodes 18x. The ratio (n/N) of the number of electrodes n exhibiting the local distribution to the number of electrodes N exhibiting the entire distribution is preferably, for example, equal to or smaller than ½, more preferably, equal to or smaller than ¼, and yet more preferably, equal to or smaller than ⅛.

In other words, the numbers of line electrodes 18x and 18y exhibiting the local distribution are smaller than the numbers of arranged line electrodes 18x and 18y exhibiting the entire distribution. Here, "small" denotes that, when, for example, the sensor electrodes include N rows vertically×M columns horizontally (for example, 50 rows×70 columns),

[1] level values of current or voltage of less than N electrodes, preferably, less than N/2 electrodes, more ideally, less than 10 electrodes, are used to determine the coordinate in the vertical direction, and

[2] level values of current or voltage of less than M electrodes, preferably, less than M/2 electrodes, more ideally, less than 10 electrodes, are used to determine the coordinate in the horizontal direction.

It is desirable that the numbers be the same in the vertical direction and the horizontal direction. In this way, for example, in the case of the 50×70 sensor electrodes in the example described above, the two-dimensional coordinates can be obtained by learning of, for example, 10+10, as compared to learning of a neural network corresponding to the number of states of cross points (the number of inputs of 3,500). The order of the number of calculations, such as the number of multiplications, computed in the neural network can be reduced from exponential (square) to linear (10+10).

Note that, when the sensor electrodes include N block electrodes vertically and M block electrodes horizontally, level values of current or voltage of less than N electrodes in the vertical direction, preferably, less than N/2 electrodes in the vertical direction, and more ideally, less than 10 electrodes in the vertical direction, are used.

In step S2, the feature value calculation unit 42 uses the first signal distribution acquired in step S1, to calculate feature values (hereinafter, referred to as "first feature values") indicating the shape feature of the first signal distribution. Similarly, the feature value calculation unit 42 uses the second signal distribution acquired in step S1, to calculate feature values (hereinafter, referred to as "second feature values") indicating the shape feature of the second signal distribution.

Figure 8A:
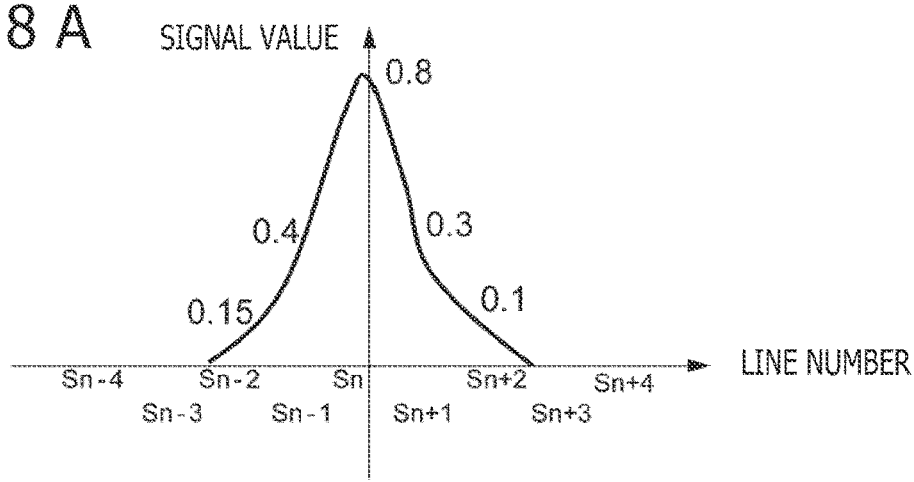
FIGS. 8A-8C are diagrams illustrating an example of a calculation method of local feature values.

As illustrated in FIG. 8A, it is assumed that the obtained signal distribution includes $S_{n-2}=0.15/S_{n-1}=0.40/S_n=0.80/S_{n+1}=0.30/S_{n+2}=0.10$ in ascending order of line number. Note that the signal values in other line numbers are 0 or small values that can be ignored. $\{G_i\}$ and $\{F_i\}$ are calculated according to, for example, the following Equations (1) and (2).

$$G_i = (S_i - S_{i-2}) + (S_{i-1} + S_{i-3}) \tag{1}$$

$$F_i = |G_i| / \max\{|G_i|\} \tag{2}$$

Figure 8B:
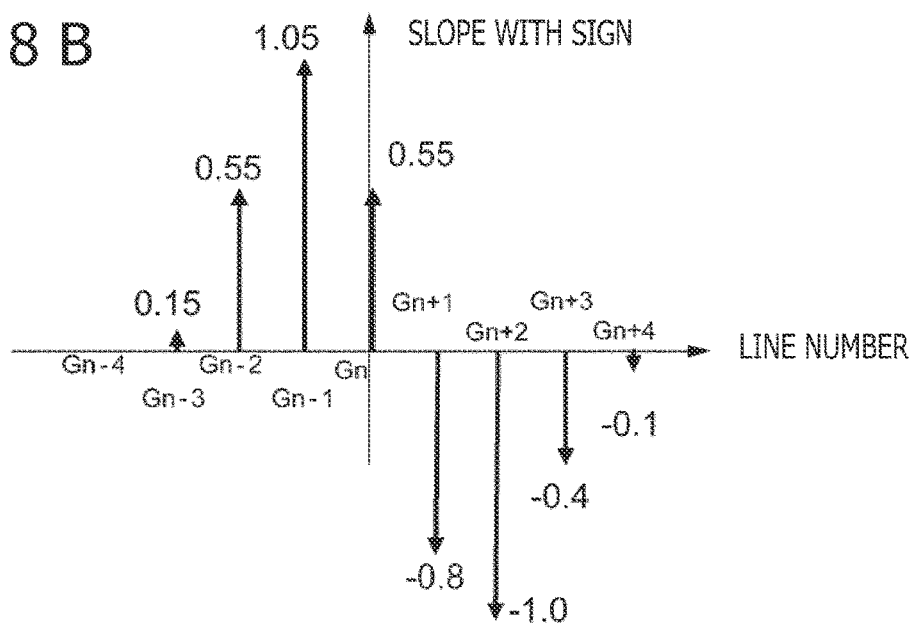
Figure 8C:
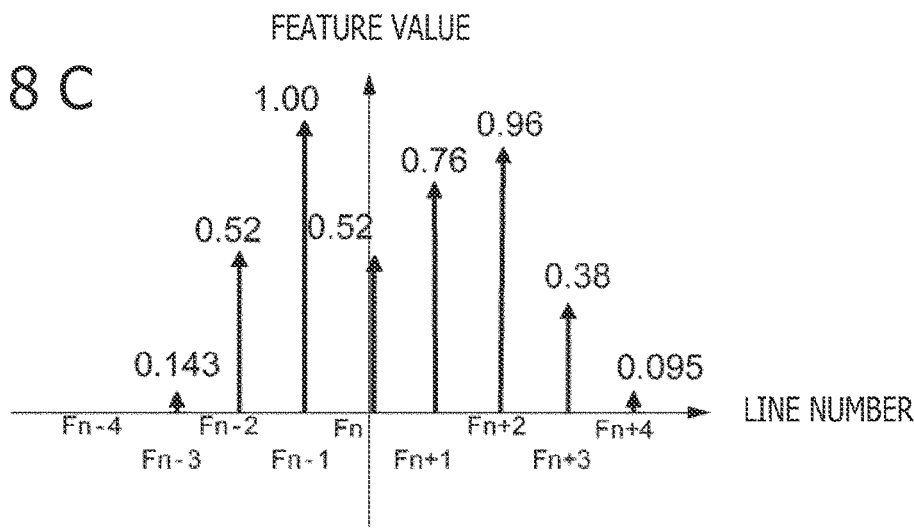

As a result, a "tilt with sign" $\{G_i\}$ illustrated in FIG. 8B and a feature value $\{F_i\}$ illustrated in FIG. 8B are calculated. As can be understood from Equation (2), the feature value $\{F_i\}$ corresponds to the "tilt without sign" normalized in the range of [0, 1].

Note that the feature value calculation unit 42 may calculate various feature values characterizing the shape of the signal distribution instead of the tilts of the signal distribution or the absolute values of the tilts. In addition, the feature value calculation unit 42 may use the same calculation method as in the case of the first feature values to calculate the second feature values or may use a calculation method different from the case of the first feature values to calculate the second feature values. In addition, the feature values may be the signal distribution itself. Although the feature value calculation unit 42 calculates one feature value for each of the line electrodes 18x and 18y, the relation between the number of line electrodes 18x and 18y and the number of feature values is not limited to the example. That is, instead of the one-to-one relation, the relation may be a one-to-many, many-to-one, or many-to-many relation.

Here, the feature value calculation unit 42 uses only the local distributions to calculate the feature values (hereinafter, referred to as "local feature values") and reduce the number of feature values used for estimation described later. Specifically, the feature value calculation unit 42 may extract the local distributions from the entire distribution and then use the local distributions to calculate the local feature values or may calculate the feature values across the entire distribution and then extract the local feature values corresponding to the local distributions. The local feature values may include a certain number of pieces of data (for example, N pieces) regardless of the number of arranged line electrodes 18x and 18y. The constant number of data used for estimation can make a uniform estimate independent of the configuration of the touch sensor 18.

When the local feature values are used, the first feature values include first local feature values and a reference position, and the second feature values include second local feature values. The "first local feature values" denote local feature values related to only the local distribution (that is, the first local distribution) included in the first signal distribution. The "second local feature values" denote local feature values related to only the local distribution (that is, the second local distribution) included in the second signal distribution. The "reference position" denotes a position of a reference point of the first local distribution in the sensor coordinate system, and the "reference position" may be, for example, one of a rising position, a falling position, and a peak position of the first local distribution or may be a neighborhood position of these.

In step S3 of FIG. 6, the angle estimation unit 44 estimates the inclination angle of the electronic pen 14 from the second feature values calculated in step S2. Further, the feature value calculation unit 42 estimates the instruction position of the electronic pen 14 from the first feature values and the inclination angle. A machine learning estimator 50 is used to estimate the pen state. The machine learning may be, for example, "learning with training" in which training data obtained by actual measurement or calculation simulation is used.

Figure 9:
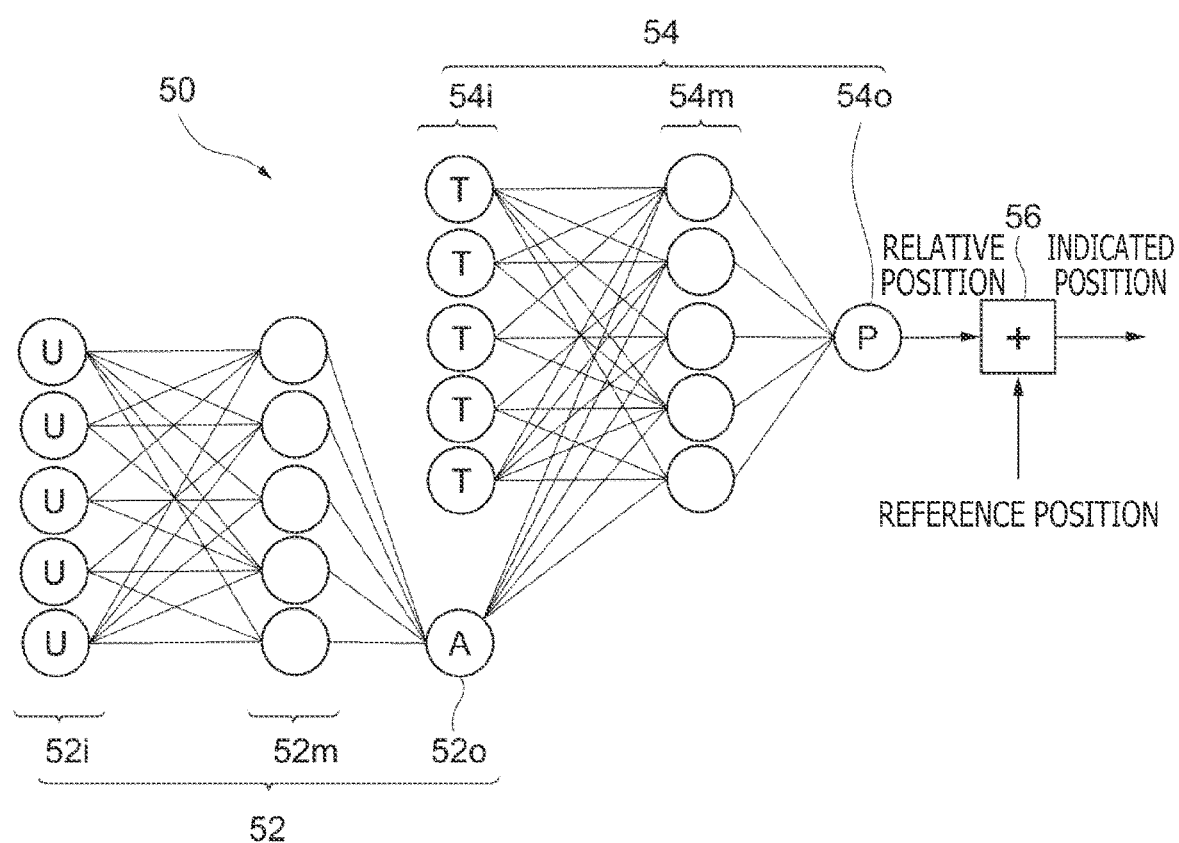
FIG. 9 is a diagram illustrating a configuration of an estimator included in the pen detection function of FIG. 5.

FIG. 9 is a diagram illustrating a configuration of the estimator 50 included in the pen detection function 28A of FIG. 5. The estimator 50 includes a former computation element 52, a latter computation element 54, and an adder 56 sequentially connected in series. The former computation element 52 corresponds to the angle estimation unit 44 illustrated in FIG. 5, and the latter computation element 54 and the adder 56 correspond to the position estimation unit 46 illustrated in FIG. 5.

Note that circles in FIG. 9 represent computation units corresponding to neurons of the neural network. The values of the "first local feature values" corresponding to the tip electrode 30 are stored in the computation units with "T." The values of the "second local feature values" corresponding to the upper electrode 32 are stored in the computation units with "U." The "inclination angle" is stored in the computation unit with "A." The "relative position" is stored in the computation unit with "P."

The former computation element 52 is, for example, a hierarchical neural net computation element including an input layer 52i, a middle layer 52m, and an output layer 52o. The input layer 52i includes N computation units for inputting the values of the second local feature values. The middle layer 52m includes M (here, M=N) computation units. The output layer 52o includes one computation unit for outputting the inclination angle.

The latter computation element 54 is, for example, a hierarchical neural net computation element including an input layer 54i, a middle layer 54m, and an output layer 54o. The input layer 54i includes (N+1) computation units for inputting the values of the first local feature values and the inclination angle. The middle layer 54m includes, for example, M (here, M=N) computation units. The output layer 54o includes one computation unit for outputting the relative position between the reference position and the instruction position.

The adder 56 adds the relative position from the latter computation element 54 to the reference position included in the first feature values, to output the instruction position of the electronic pen 14. The instruction position is a position corresponding to the peak center of the first local distribution, and the resolution is higher than the pitch of the line electrodes 18x and 18y.

Figure 10:
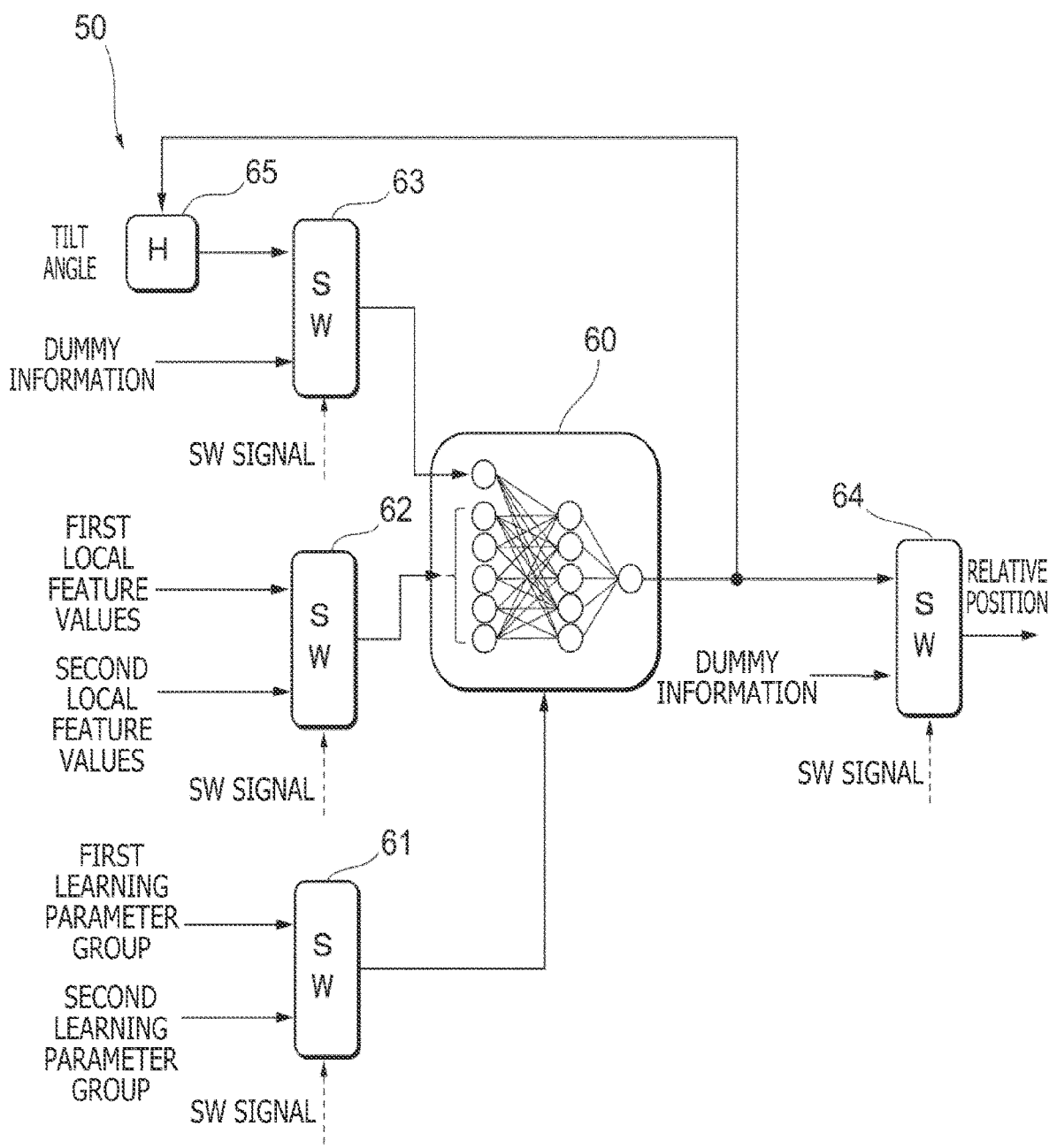
FIG. 10 is a diagram illustrating an implementation example of the estimator in FIG. 9.

FIG. 10 is a diagram illustrating an implementation example of the estimator 50 in FIG. 9. The estimator 50 includes a common computation element 60, four switches 61, 62, 63, and 64 that can be synchronously switched, and a holding circuit 65. The common computation element 60 is a neural net computation element that inputs (N+1) variables and that outputs one variable, and the common computation element 60 can be used in common as the former computation element 52 or the latter computation element 54 of FIG. 9.

The switch 61 switches and outputs one of a first learning parameter group (that is, a learning parameter group for position computation) and a second learning parameter group (that is, a learning parameter group for angle computation) in response to input of a switch signal. Here, the output side of the switch 61 is connected to the common computation element 60, and the learning parameter group is selectively supplied to the common computation element 60.

The computation rule of the common computation element 60 is determined by values of learning parameters included in the learning parameter group. The learning parameter group includes, for example, coefficients describing activation functions of computation units, "variable parameters" including the coupling strength between computation units, and "fixed parameters" (what is generally called hyperparameters) for specifying the architecture of learning model. Examples of the hyperparameters include the number of computation units included in each layer and the number of middle layers. The architecture is fixed in the implementation example, and thus, the learning parameter group includes only the variable parameters.

The switch 62 outputs one of the first local feature values (that is, the input values for position computation) and the second local feature values (that is, the input values for angle computation) in response to input of a switch signal. The output side of the switch 62 is connected to the input side of the common computation element 60, and the local feature values are selectively supplied to the common computation element 60.

The switch 63 switches and outputs one of a held value (here, an estimated value of an inclination angle) in the holding circuit 65 and dummy information (for example, a zero value) in response to input of a switch signal. The output side of the switch 63 is connected to the input side of the common computation element 60, and the inclination angle is supplied to the common computation element 60 only at the time of execution of the position computation.

The switch 64 switches and outputs one of an output value (here, an estimated value of an instruction position) of the common computation element 60 and dummy information (for example, a zero value) in response to input of a switch signal. Therefore, the instruction position is output from the switch 64 only at the time of execution of the position computation.

The holding circuit 65 temporarily holds the output value of the common computation element 60. The inclination angle and the instruction position are alternately held in the holding circuit 65, and in practice, the held value is read only at the time of execution of the position computation.

In this way, the estimator 50 of FIGS. 9 and 10 is used to estimate the instruction position of the electronic pen 14 (step S3). Although the neural network is used to construct the estimator 50 in the example, the method of machine learning is not limited to this. For example, various methods including a logistic regression model, a support vector machine (SVM), a decision tree, a random forest, and a boosting method may be adopted.

In step S4 of FIG. 6, the pen detection function 28A supplies data including the instruction position and the inclination angle estimated in step S3 to the host processor 22. For example, the pen detection function 28A may repeat steps S1 to S3 twice to estimate the X-axis coordinate value and the Y-axis coordinate value and supply the coordinate values (X, Y) of the instruction position to the host processor 22. Alternatively, the pen detection function 28A may estimate the coordinate values (X, Y) of the instruction position at the same time through steps S1 to S3 and supply the coordinate values (X, Y) to the host processor 22.

In this way, the flow chart of FIG. 6 is finished. The touch IC 20 sequentially executes the flow chart at predetermined time intervals to detect the instruction positions according to the movement of the electronic pen 14.

Comparison of Estimation Accuracy

Figure 11A:
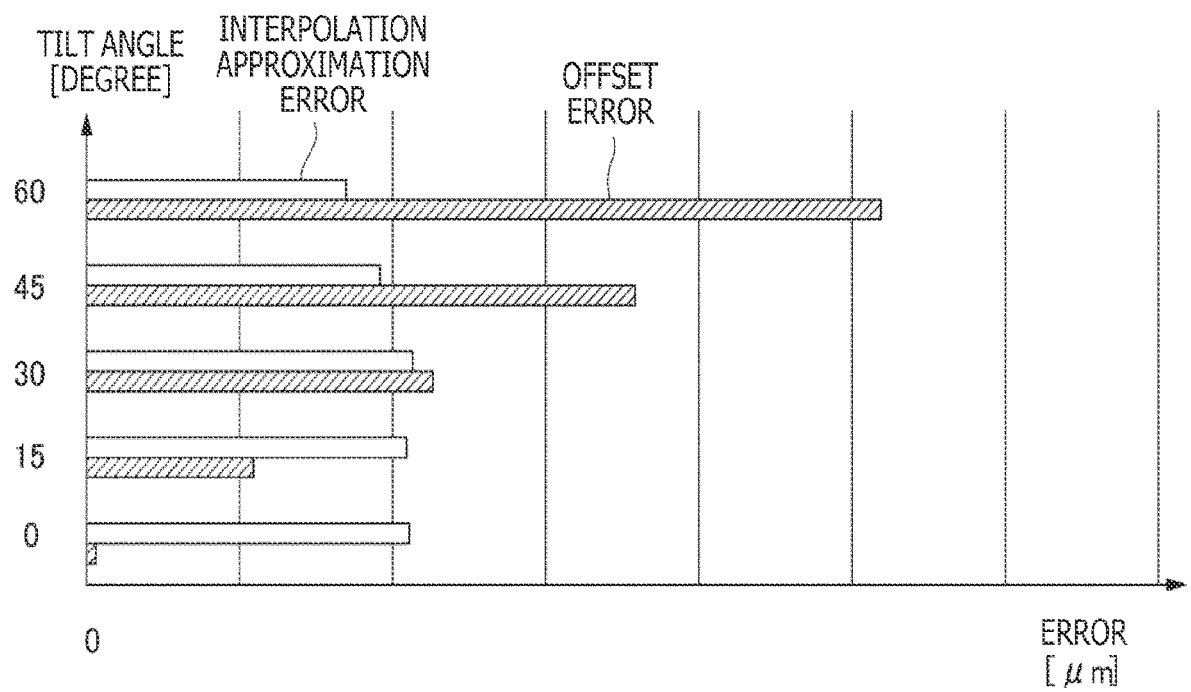
FIG. 11A is a diagram illustrating estimation accuracy of the instruction position according to a conventional example.
Figure 11B:
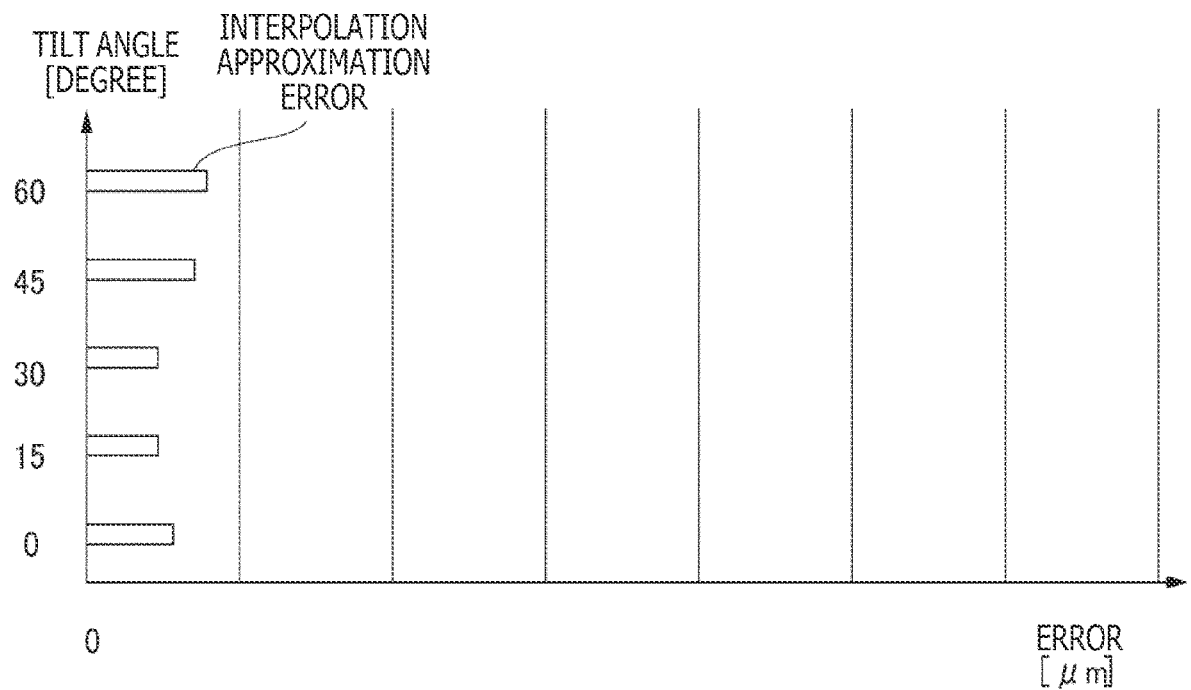
FIG. 11B is a diagram illustrating estimation accuracy of the instruction position according to the embodiments.

Next, an improvement effect for the estimation accuracy of the machine learning estimator 50 will be described with reference to FIG. 11. FIG. 11A is a diagram illustrating estimation accuracy of the instruction position in the "conventional example," and FIG. 11B is a diagram illustrating estimation accuracy of the instruction position in the "embodiments." Here, five inclination angles are set, and the sizes of interpolation approximation errors (upper bars) and offset errors (lower bars) are calculated. Note that a method of using a predetermined interpolation function for the signal distribution to calculate the positions Q1 and Q2 is used for comparison (conventional example).

As illustrated in FIG. 11A, substantially constant interpolation approximation errors occur regardless of the inclination angle in the conventional example, and the offset errors increase with an increase in the inclination angle. On the other hand, as illustrated in FIG. 11B, the interpolation approximation errors in the embodiments are reduced to half or less than half the conventional example, and the offset errors are small regardless of the inclination angle.

Conclusion of First Embodiment

In this way, the touch IC 20 is a pen state detection circuit that detects the state of the electronic pen 14 including a first electrode, on the basis of the signal distribution detected by the capacitance touch sensor 18 including a plurality of sensor electrodes (line electrodes 18x and 18y) arranged in a plane shape. Further, the touch IC 20 (one or a plurality of processors) acquires, from the touch sensor 18, the first signal distribution indicating the change in capacitance associated with the approach of the first electrode (S1 of FIG. 6) and uses the machine learning estimator 50 to estimate the instruction position or the inclination angle of the electronic pen 14 from the first feature values related to the first signal distribution (S3). Further, the first feature values include the first local feature values related to the first local distribution corresponding to the line electrodes 18x and 18y in a number fewer than the number of arranged line electrodes 18x and 18y exhibiting the first signal distribution.

Alternatively, when the electronic pen 14 includes the first electrode and a second electrode, the touch IC 20 (one or a plurality of processors) acquires, from the touch sensor 18, the first signal distribution indicating the change in capacitance associated with the approach of the first electrode and the second signal distribution indicating the change in capacitance associated with the approach of the second electrode (S1 in FIG. 6) and uses the machine learning estimator 50 to estimate the instruction position or the inclination angle of the electronic pen 14 from the first feature values related to the first signal distribution and the second feature values related to the second signal distribution (S3). Further, the first feature values include the first local feature values corresponding to the line electrodes 18x and 18y in a number fewer than the number of arranged line electrodes 18x and 18y exhibiting the first signal distribution, and the second feature values include the second local feature values related to the second local distribution corresponding to the line electrodes 18x and 18y in a number fewer than the number of arranged line electrodes 18x and 18y exhibiting the second signal distribution.

In this way, the machine learning estimator 50 can be used to extract potential detection patterns through machine learning, and this facilitates appropriate reflection of the tendency of the detection patterns in estimating the instruction position or the inclination angle. This improves the estimation accuracy of the pen state in the electronic pen 14 including at least one electrode. In addition, the local feature values related to the local distribution corresponding to the line electrodes 18x and 18y in a number fewer than the number of arranged line electrodes 18x and 18y exhibiting the signal distribution can be used to reduce the processing load of the estimator 50 to which the local feature values are to be input.

In addition, the first electrode may be the tip electrode 30 that has a shape symmetrical with respect to the axis of the electronic pen 14 and that is provided at the tip of the electronic pen 14, and the second electrode may be the upper electrode 32 that has a shape symmetrical with respect to the axis of the electronic pen 14 and that is provided on the base end side of the tip electrode 30. The relation between the inclination angle and the detection position of the electronic pen 14 tends to vary according to the three-dimensional shape of the upper electrode 32, making the improvement effect for the estimation accuracy more noticeable.

In addition, the first local feature values and/or the second local feature values may include a certain number of pieces of data regardless of the number of arranged line electrodes 18x and 18y. The constant number of data used for estimation can make a uniform estimate independent of the configuration of the touch sensor 18 (that is, the number of arranged line electrodes 18x and 18y).

In addition, the first (or second) local distribution may be a distribution with a relatively large change in capacitance in the first (or second) signal distribution. The first (or second) local feature values excluding the signal distribution with a relatively small change in capacitance as compared to the first (or second) local distribution are used, making the improvement effect for the estimation accuracy more noticeable.

In addition, the first feature values may further include the reference position of the first local distribution in the sensor coordinate system defined on the detection surface of the touch sensor 18. The estimator 50 may be able to execute position computation with the relative position between the reference position and the instruction position as an output value. The touch IC 20 may add the relative position to the reference position to estimate the instruction position.

In addition, the estimator 50 may be able to sequentially execute angle computation with the second local feature values as input values and with the inclination angle as an output value; and position computation with the first local feature values and the inclination angle as input values and with the relative position as an output value. The inclination angle highly correlated with the instruction position is explicitly used to perform the position computation, and this further increases the estimation accuracy of the instruction position.

Further, the estimator 50 may include the switch 61 that can switch and output one of the learning parameter group for angle computation and the learning parameter group for position computation; the switch 62 that can switch and output one of the input value for angle computation and the input value for position computation; and the common computation element 60 that can selectively execute the angle computation or the position computation according to the switch of the switches 61 and 62. As a result, the configuration of the computation element is simpler than that in the case where the computation elements used for two purposes are separately provided.

In addition, the first local feature values may include feature values indicating the tilts of the first local distribution or the absolute values of the tilts, and the second local feature values may include feature values indicating the tilts of the second local distribution or the absolute values of the tilts. The local feature values tend to strongly characterize the detection pattern, making it easier to improve the accuracy.

Modifications of First Embodiment

Next, first to fifth modifications of the first embodiment will be described with reference to FIGS. 12 to 15. Note that the same reference signs are provided to constituent elements similar to those of the case of the first embodiment, and the description may not be repeated.

First Modification

Figure 12A:
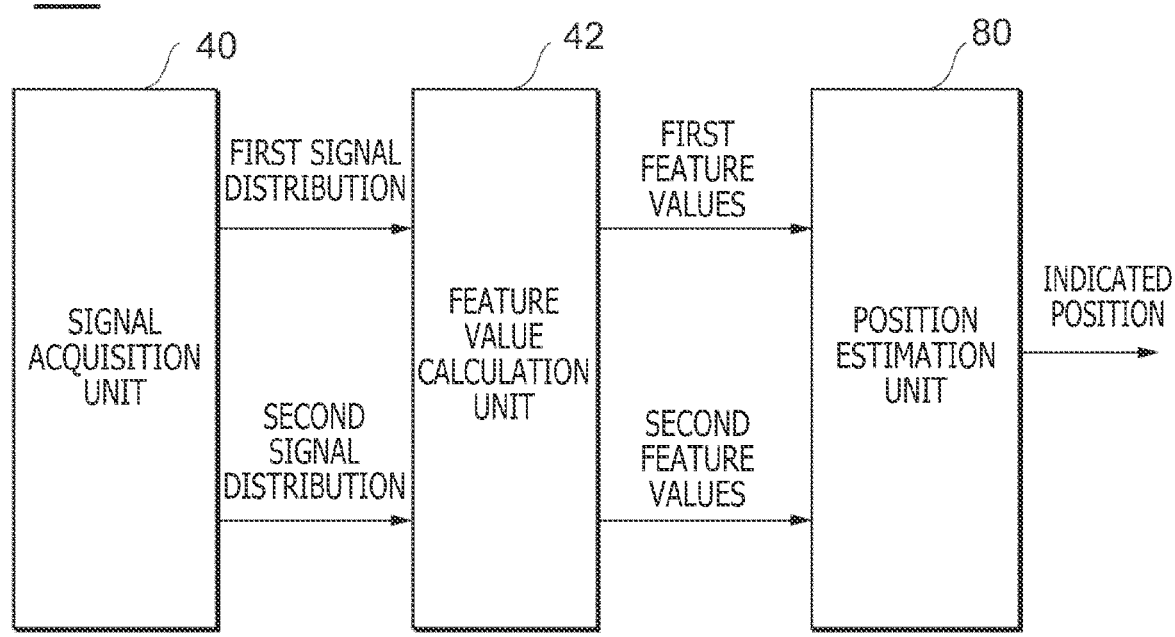
FIG. 12A is a block diagram illustrating a pen detection function according to a first modification of the first embodiment.

FIG. 12A is a block diagram illustrating a pen detection function 28B according to the first modification of the first embodiment. The pen detection function 28B includes the signal acquisition unit 40, the feature value calculation unit 42, and a position estimation unit 80 configured differently from that in the first embodiment. That is, the pen detection function 28B is different from the configuration of the pen detection function 28A of FIG. 5 in that the angle estimation unit 44 is not provided.

Figure 12B:
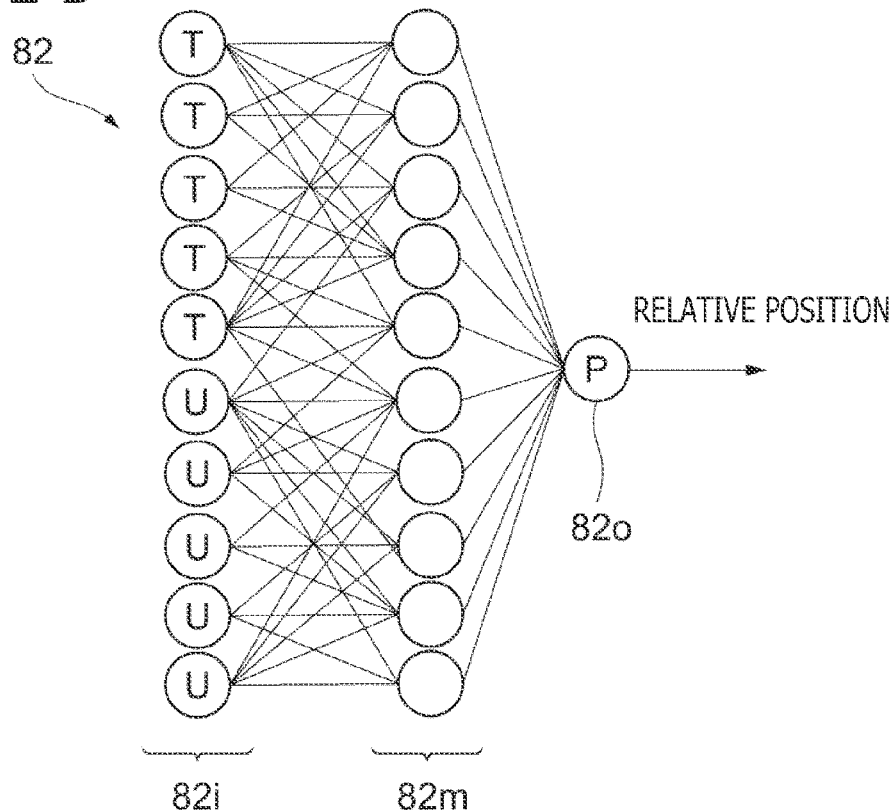
FIG. 12B is a diagram illustrating a configuration of an estimator included in the pen detection function of FIG. 12A.

FIG. 12B is a diagram illustrating a configuration of an estimator 82 included in the pen detection function 28B of FIG. 12A. The estimator 82 corresponds to the position estimation unit 80 illustrated in FIG. 12A. The estimator 82 is, for example, a hierarchical neural net computation element including an input layer 82i, a middle layer 82m, and an output layer 82o. The input layer 82i includes 2N computation units for inputting the values of the first local feature values and the second local feature values. The middle layer 82m includes M (here, M=2N) computation units. The output layer 82o includes one computation unit for outputting the relative position between the reference position and the instruction position.

In this way, the estimator 82 of the pen detection function 28B may execute position computation with the first local feature values and the second local feature values as input values and with the relative position as an output value. When this configuration is adopted, the instruction position of the electronic pen 14 can be estimated with high accuracy as in the estimator 50 (FIG. 9) of the first embodiment.

Second Modification

Figure 13A:
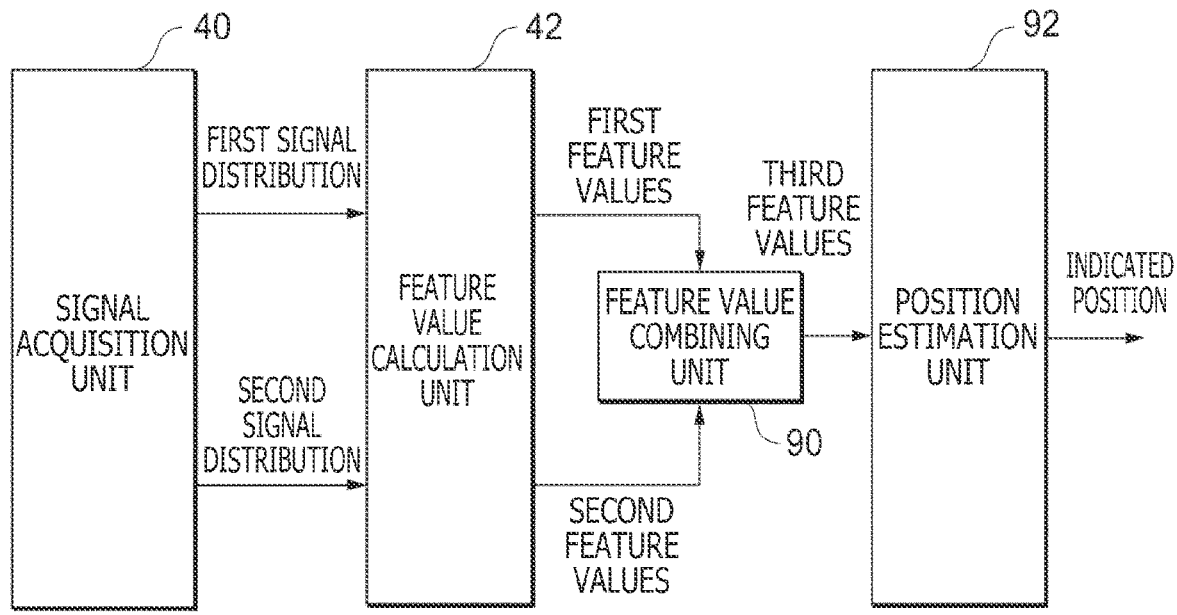
FIG. 13A is a block diagram illustrating a pen detection function according to a second modification of the first embodiment.

FIG. 13A is a block diagram illustrating a pen detection function 28C according to the second modification of the first embodiment. The pen detection function 28C includes the signal acquisition unit 40, the feature value calculation unit 42, a feature value combining unit 90, and a position estimation unit 92 with a function different from that in the first modification. That is, the pen detection function 28C is different from the pen detection function 28B of the first modification in that the feature value combining unit 90 is provided.

Figure 13B:
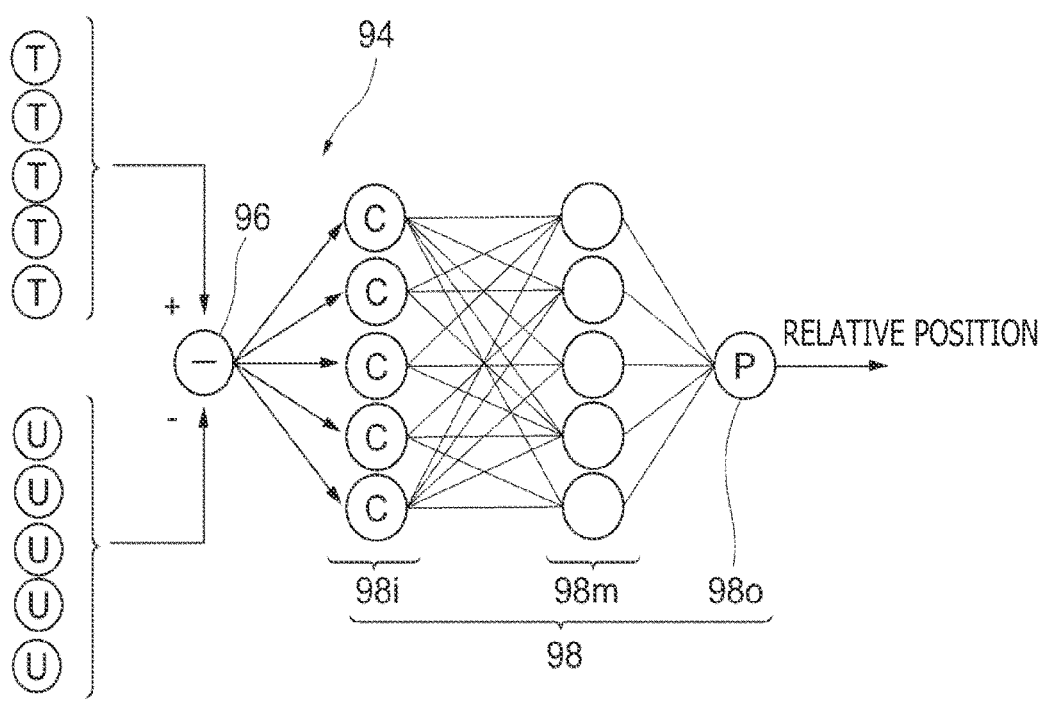
FIG. 13B is a diagram illustrating a configuration of an estimator included in the pen detection function of FIG. 13A.

FIG. 13B is a diagram illustrating a configuration of an estimator 94 included in the pen detection function 28C of FIG. 13A. The estimator 94 includes a combiner 96 and a computation element 98. The combiner 96 corresponds to the feature value combining unit 90 illustrated in FIG. 13A, and the computation element 98 corresponds to the position estimation unit 92 illustrated in FIG. 13A.

The combiner 96 includes a computation element that outputs third feature values (for example, a difference or ratio of local feature values, an average of reference positions, and the like) indicating relative values between the first feature values and the second feature values. Note that the values of the "third feature values" obtained by combining are stored in computation units with "C."

The computation element 98 is, for example, a hierarchical neural net computation element including an input layer 98i, a middle layer 98m, and an output layer 98o. The input layer 98i includes N computation units for inputting the values of the third feature values. The middle layer 98m includes M (here, M=N) computation units. The output layer 98o includes one computation unit for outputting the relative position between the reference position and the instruction position. Note that the computation element 98 may be able to output the inclination angle in addition to or instead of the relative position.

In this way, the estimator 94 of the pen detection function 28C may include the combiner 96 that combines the first feature values and the second feature values to output the third feature values; and the computation element 98 that sets the third feature values as input values and sets the instruction position or the inclination angle as an output value. When this configuration is adopted, the instruction position of the electronic pen 14 can also be estimated with high accuracy as in the estimator 50 (FIG. 9) of the first embodiment.

Third Modification

Figure 14A:
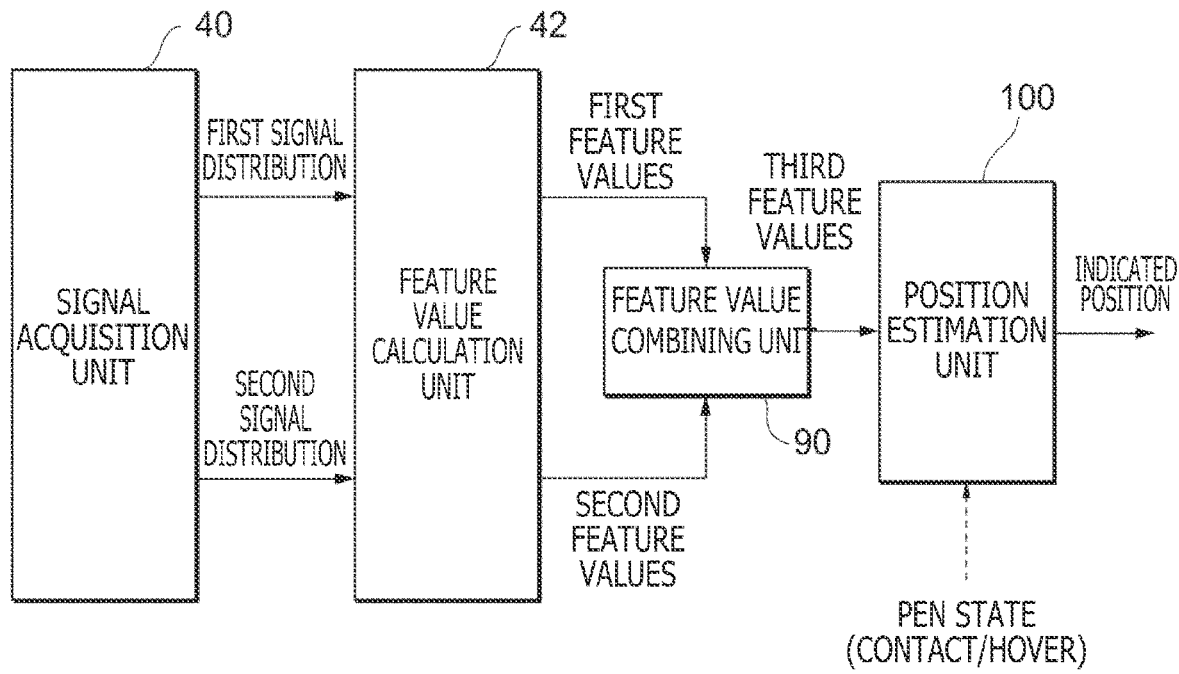
FIG. 14A is a block diagram illustrating a pen detection function according to a third modification of the first embodiment.

FIG. 14A is a block diagram illustrating a pen detection function 28D according to the third modification of the first embodiment. The pen detection function 28D includes the signal acquisition unit 40, the feature value calculation unit 42, the feature value combining unit 90, and a position estimation unit 100 with a function different from that in the second modification.

Figure 14B:
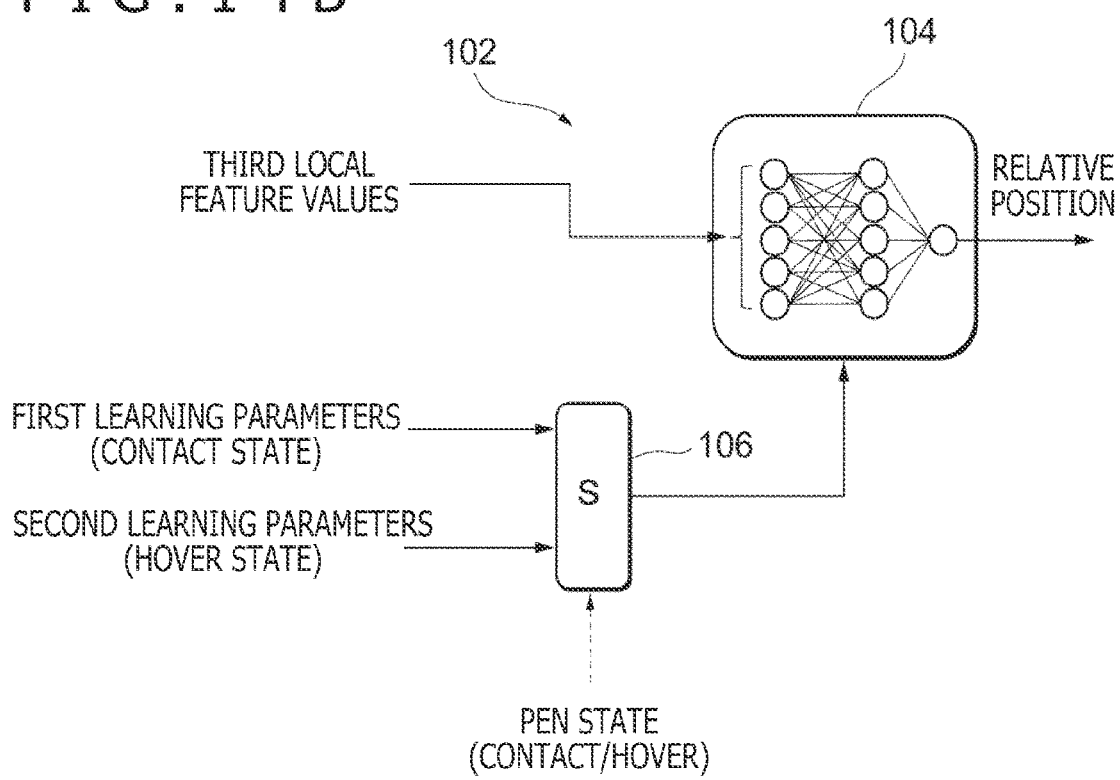
FIG. 14B is a diagram illustrating a configuration of an estimator included in the pen detection function of FIG. 14A.

FIG. 14B is a diagram illustrating a configuration of an estimator 102 included in the pen detection function 28D of FIG. 14A. The estimator 102 includes a common computation element 104 and a switch 106 and corresponds to the position estimation unit 100 illustrated in FIG. 14A. The common computation element 104 is a neural net computation element that inputs third local feature values (N variables) from the feature value combining unit 90 illustrated in FIG. 14A and that outputs the relative position (one variable). Note that the common computation element 104 may be able to output the inclination angle in addition to or instead of the relative position.

The switch 106 switches and outputs one of the first learning parameter group (that is, a learning parameter group suitable for the contact state) and the second learning parameter group (that is, a learning parameter group suitable for the hover state) in response to input of a switch signal. Here, the output side of the switch 106 is connected to the common computation element 104, and the learning parameter group is selectively supplied to the common computation element 104.

Note that the "contact state" denotes a state in which the tip portion of the electronic pen 14 is in touch with the detection surface of the electronic device 12. On the other hand, the "hover state" denotes a state in which the tip portion of the electronic pen 14 is not in touch with the detection surface of the electronic device 12. For example, when the electronic pen 14 includes a sensor that detects a press of the tip portion, the touch IC 20 can analyze the downlink signal transmitted from the electronic pen 14 and identify the two states.

In this way, the instruction position or the inclination angle of the electronic pen 14 may be estimated by using the estimator 102 in which different learning parameter groups are set according to whether the electronic pen 14 is in the contact state or the hover state. In this way, the tendency of the change in shape of the signal distribution according to the clearance between the electronic pen 14 and the touch sensor 18 can be reflected in the computation, and the estimation accuracy is increased in both states.

Fourth Modification

The line electrodes 18x and 18y are connected to one touch IC 20 through extension lines not illustrated. That is, the length of wiring varies according to the positions of the line electrodes 18x and 18y, and the degree of change in capacitance, that is, the sensitivity, varies in the detection surface of the touch sensor 18. As a result, a phenomenon, such as distortion of local distribution, may occur, and this may impair the estimation accuracy of the pen state. Therefore, the non-uniformity of sensitivity may be taken into account to estimate the pen state.

FIG. 15 is a diagram illustrating a configuration of an estimator 110 according to the fourth modification of the first embodiment. The estimator includes a former computation element 112 and a latter computation element 114 sequentially connected in series. The former computation element 112 corresponds to the angle estimation unit 44 illustrated in FIG. 5, and the latter computation element 114 corresponds to the position estimation unit 46 illustrated in FIG. 5.

Note that circles in FIG. 15 represent computation units corresponding to neurons of the neural network. The values of the "first local feature values" corresponding to the tip electrode 30 are stored in the computation units with "T." The values of the "second local feature values" corresponding to the upper electrode 32 are stored in the computation units with "U." The "inclination angle" is stored in the computation unit with "A." The "position" (relative position or instruction position) is stored in the computation unit with "P."

The former computation element 112 is, for example, a hierarchical neural net computation element including an input layer 112i, a middle layer 112m, and an output layer 112o. The input layer 112i includes (N+1) computation units for inputting the reference position of the second local distribution and the values of the second local feature values. The middle layer 112m includes M (here, M=N) computation units. The output layer 112o includes one computation unit for outputting the inclination angle.

The latter computation element 114 is, for example, a hierarchical neural net computation element including an input layer 114i, a middle layer 114m, and an output layer 114o. The input layer 114i includes (N+2) computation units for inputting the reference position of the first local distribution, the values of the first local feature values, and the inclination angle. The middle layer 114m includes M (here, M=N) computation units. The output layer 114o includes one computation unit for outputting the relative position (or the instruction position).

In this way, the estimator 110 may execute the position computation with the first local feature values and the reference position as input values and with the relative position or the instruction position as an output value. This can reflect the tendency of the change in shape of the first local distribution according to the reference position, and the estimation accuracy is higher than that in the case where the reference position is not input.

Fifth Modification

Although the holding circuit 65 illustrated in FIG. 10 is connected to a first input side (upper side of FIG. 10) of the switch 63 in the first embodiment, the holding circuit 65 may conversely be connected to a second input side (lower side of FIG. 10) of the switch 63. In this way, the estimator 50 can use the first local feature values and the instruction position of last time to estimate the inclination angle of this time. Alternatively, a delay circuit can be provided between the common computation element 60 and the holding circuit 65 in place of the switch 63 to make both [1] an estimate of the instruction position of this time by further using the inclination angle of this time and [2] an estimate of the inclination angle of this time by further using the instruction position of last time.

Second Embodiment

Next, a pen detection function 28E of a touch IC 140 according to a second embodiment will be described with reference to FIGS. 16 to 19.

Configuration and Operation

The basic configuration in the second embodiment is similar to that in the first embodiment (FIGS. 1 to 4), and the description will thus not be repeated. However, a case in which the electronic pen 14 (FIG. 2) includes only the tip electrode 30 will be illustrated.

Figure 16:
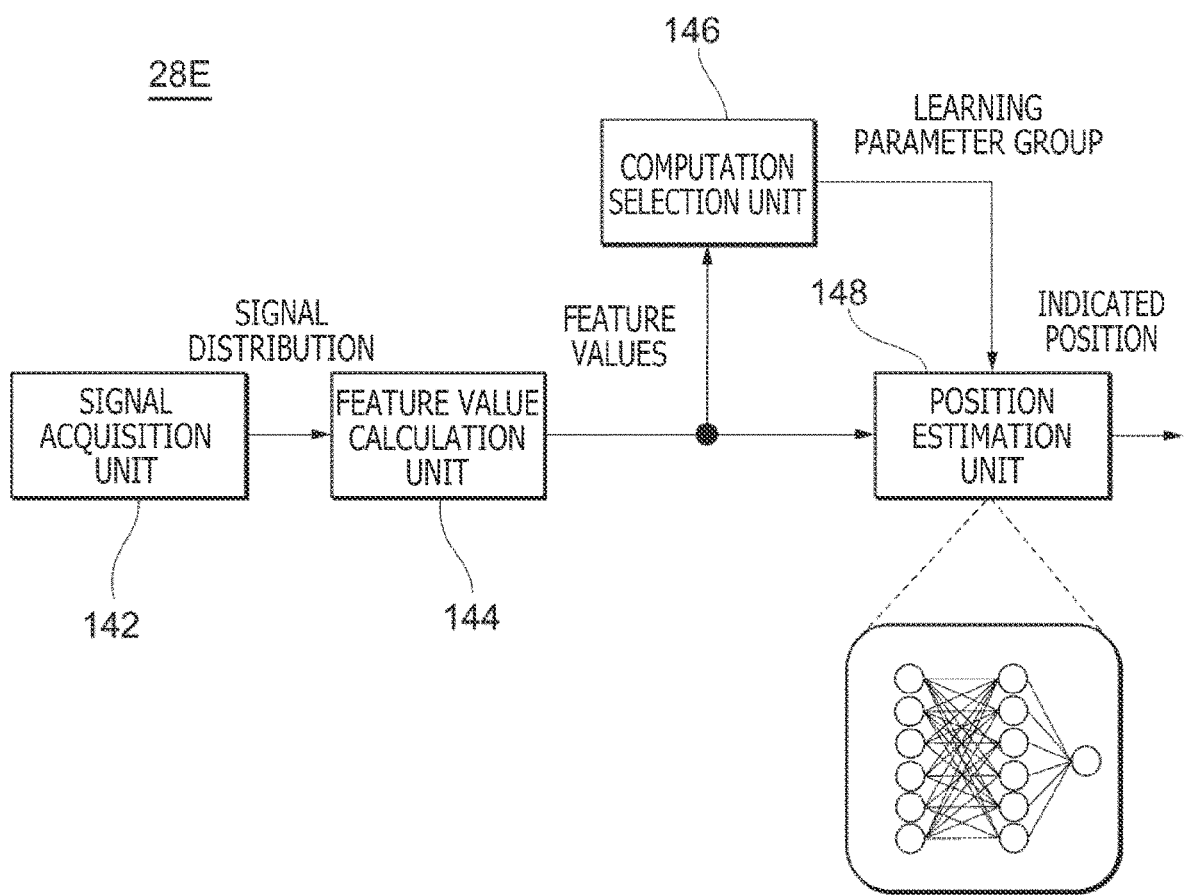
FIG. 16 is a block diagram illustrating a pen detection function according to a second embodiment.

FIG. 16 is a block diagram illustrating the pen detection function 28E according to the second embodiment. The pen detection function 28E includes a signal acquisition unit 142, a feature value calculation unit 144, a computation selection unit 146, and a position estimation unit 148. Next, an operation of the touch IC 140 associated with execution of the pen detection function 28E will be described with reference to a flow chart of FIG. 17.

Figure 17:
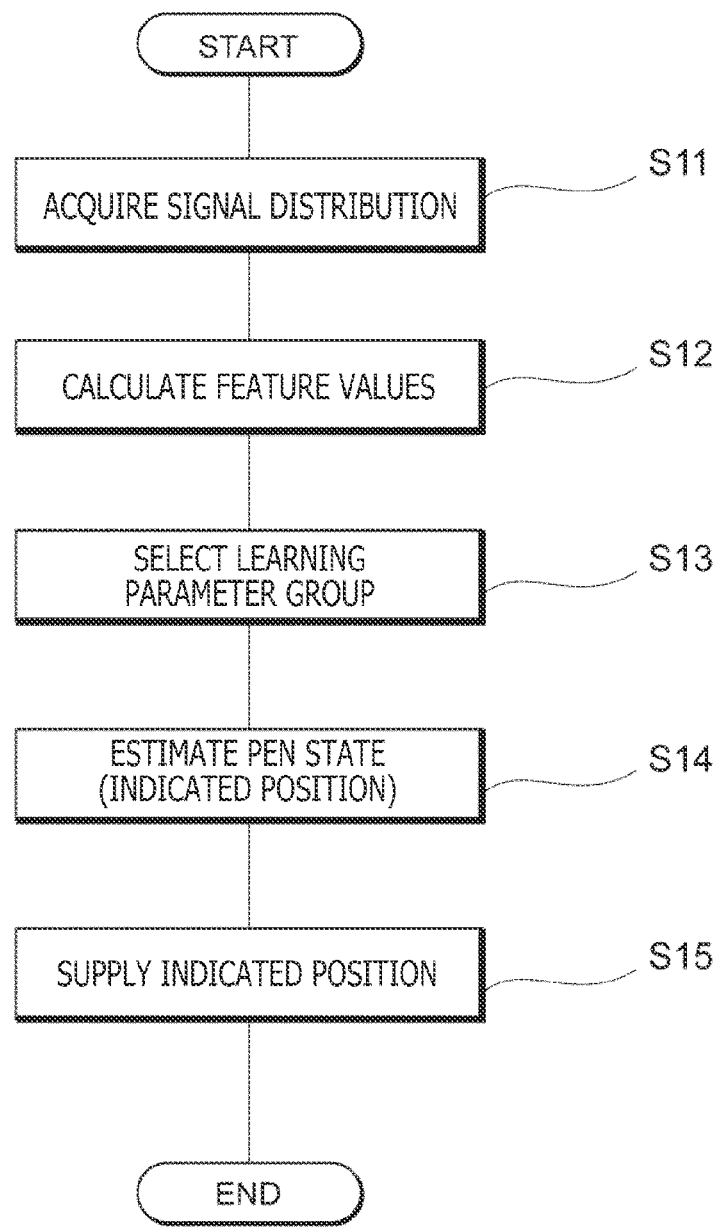
FIG. 17 is a flow chart executed by the pen detection function illustrated in FIG. 16.

In step S11 of FIG. 17, the signal acquisition unit 142 acquires the signal distributions from the touch sensor 18 through the scan operation of each of the line electrodes 18x and 18y. This operation is similar to that in the first embodiment (step S1 of FIG. 6), and the details will not be described.

In step S12, the feature value calculation unit 144 uses the signal distributions acquired in step S11 and calculates the feature values related to the signal distributions. The feature value calculation unit 144 may calculate the same feature values as those in the case of the first embodiment (step S2 of FIG. 6) or may calculate feature values different from those in the case of the first embodiment. For example, the feature value calculation unit 144 may calculate feature values related to the entire signal distribution instead of the local feature values.

In step S13, the computation selection unit 146 selects one of a plurality of learning parameter groups on the basis of the feature values calculated in step S12. Prior to the selection, the computation selection unit 146 determines whether or not the projection position of the tip electrode 30 interferes with a periphery of the touch sensor 18.

Figure 18:
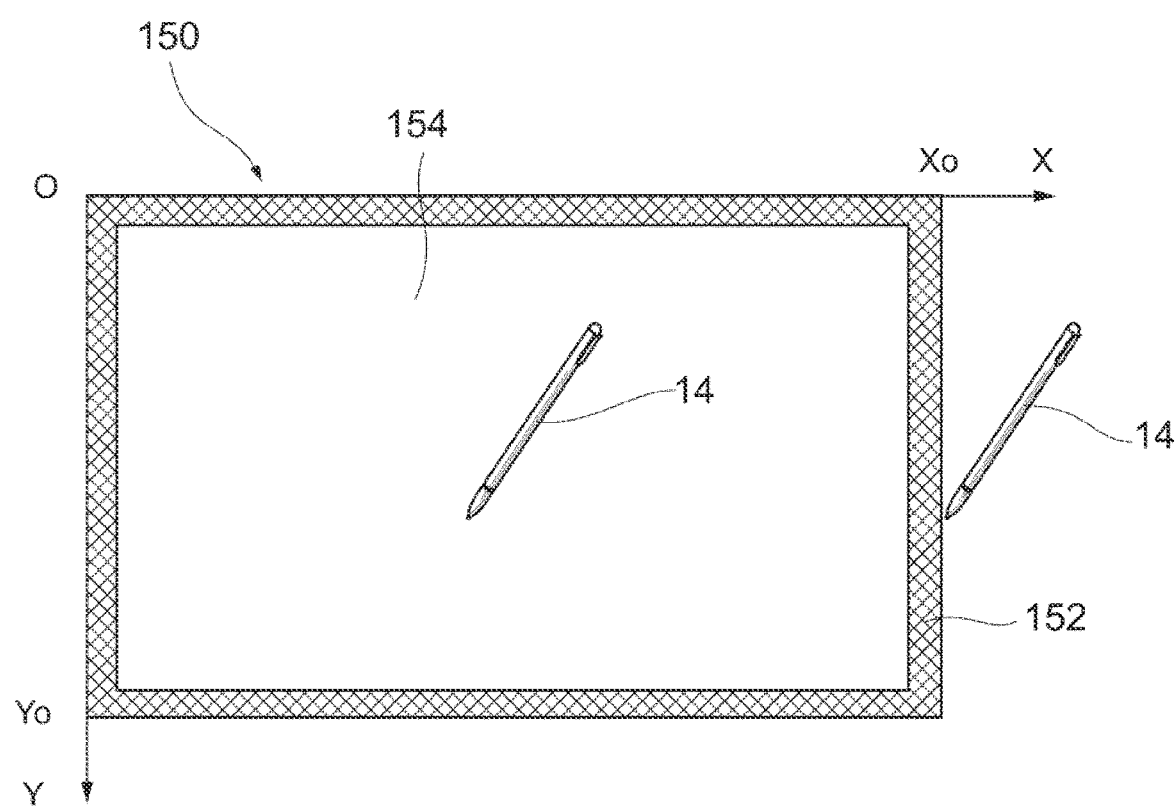
FIG. 18 is a diagram illustrating an example of a definition of a sensor area included in the touch sensor.

FIG. 18 is a diagram illustrating an example of a definition of a sensor area 150 included in the touch sensor 18. The sensor coordinate system is a two-dimensional Cartesian coordinate system including two axes (X-axis and Y-axis) passing through an origin O. The origin O is a feature point (for example, an upper left vertex) on the detection surface of the touch sensor 18. The X-Y plane coincides with the plane direction of the detection surface. A frame-shaped peripheral area 152 corresponding to the periphery of the touch sensor 18 is set in part of the sensor area 150. The shape of the peripheral area 152 (for example, a width, position, size, and the like) can be set in various ways according to the electronic device 12 or the electronic pen 14. Note that a remaining area of the sensor area 150 excluding the peripheral area 152 will be referred to as a general area 154.

Figure 19A:
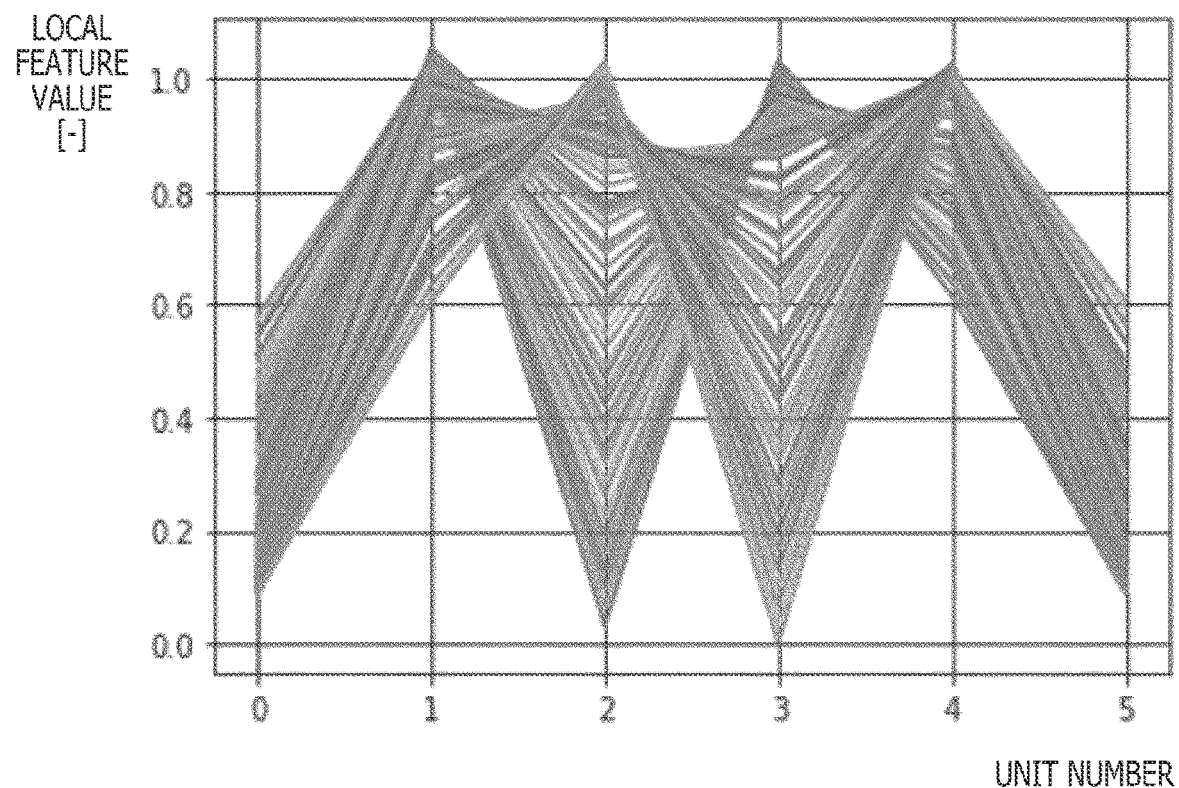
FIG. 19A is a diagram illustrating local feature values when a projection position of a tip electrode (FIG. 2) included in the electronic pen is in a general area.
Figure 19B:
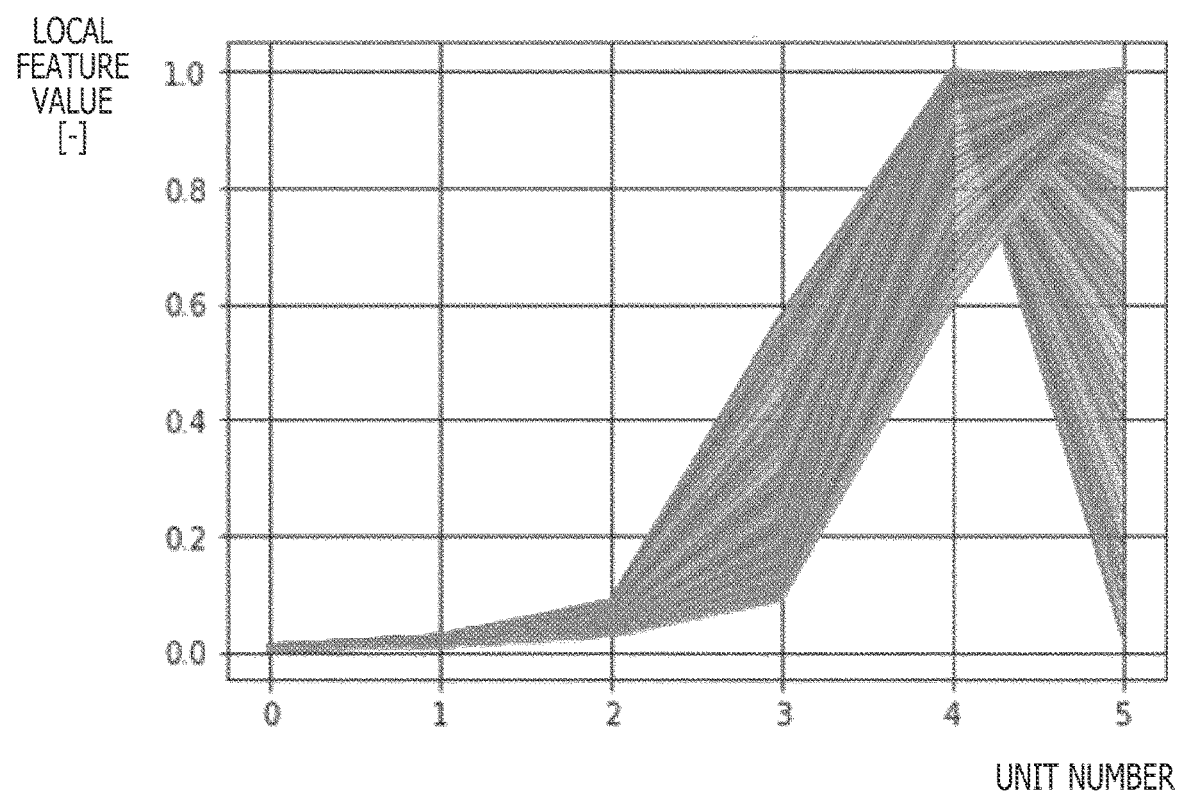
FIG. 19B is a diagram illustrating local feature values when the projection position of the tip electrode is in a peripheral area.

FIG. 19 depicts diagrams illustrating a tendency of local feature values calculated from various signal distributions. More specifically, FIG. 19A illustrates local feature values of a case in which the projection position of the tip electrode 30 (FIG. 2) included in the electronic pen 14 is in the general area 154. In addition, FIG. 19B illustrates local feature values of a case in which the projection position of the tip electrode 30 is in the peripheral area 152. In FIG. 19, a plurality of polygonal lines or plots obtained by changing the inclination angles are displayed on top of each other.

For example, it is assumed that the feature value calculation unit 144 extracts six pieces of data with consecutive addresses from the feature values calculated across the entire signal distribution and thereby calculates the local feature values corresponding to unit numbers 0 to 5. As can be understood from FIG. 19B, part of the signal distribution cannot be detected outside of the sensor area 150, and there may be a case where part of the local feature values is missing. That is, when the instruction position is estimated by applying a uniform computation rule to two types of local feature values with significantly different tendencies of shape, the estimation accuracy may vary.

Thus, the computation selection unit 146 selects a learning parameter group for general area computation and supplies the learning parameter group to the position estimation unit 148 when the reference position included in the feature values is in the general area 154. On the other hand, the computation selection unit 146 selects a learning parameter group for peripheral area computation and supplies the learning parameter group to the position estimation unit 148 when the reference position is in the peripheral area 152.

In step S14 of FIG. 17, the position estimation unit 148 estimates the instruction position of the electronic pen 14 from the feature values calculated in step S12. Specifically, the position estimation unit 148 estimates the instruction position suitable for the projection position of the tip electrode 30 by using the estimator in which the learning parameter group is selectively set. Note that the position estimation unit 148 may be able to estimate the inclination angle in addition to or instead of the instruction position.

In step S15, the pen detection function 28E supplies, to the host processor 22, data including the instruction position estimated in step S14. In this way, the flow chart of FIG. 17 is finished. The touch IC 140 sequentially executes the flow chart at predetermined time intervals to detect the instruction positions according to the movement of the electronic pen 14.

Conclusion of Second Embodiment

As described above, the touch IC 140 is a pen state detection circuit that detects the state of the electronic pen 14 including the tip electrode 30, on the basis of the signal distribution detected by the capacitance touch sensor 18 including the plurality of line electrodes 18x and 18y arranged in a plane shape. Further, the touch IC 140 (one or a plurality of processors) acquires, from the touch sensor 18, the signal distribution indicating the change in capacitance associated with the approach of the tip electrode 30 (S11 of FIG. 17) and follows different computation rules according to the projection position of the tip electrode 30 on the detection surface of the touch sensor 18, to estimate the instruction position or the inclination angle of the electronic pen 14 from the feature values related to the signal distribution (S13 and S14).

In this way, an estimate suitable for the projection position can be made by application of different computation rules according to the projection position of the tip electrode 30 included in the electronic pen 14, and this can suppress the reduction in the estimation accuracy of the pen state caused by the relative positional relation between the electronic pen 14 and the touch sensor 18.

For example, the computation rules may be rules for estimating the instruction position or the inclination angle of the electronic pen 14, and the touch IC 140 may estimate the instruction position or the inclination angle by using an estimator in which different learning parameter groups are set according to whether or not the projection position of the tip electrode 30 interferes with the periphery of the touch sensor 18.

In addition, the local feature values related to the local distribution corresponding to the line electrodes 18x and 18y in a number fewer than the number of arranged line electrodes 18x and 18y exhibiting the signal distribution can be used to reduce the processing load of the estimator 50 to which the local feature values are to be input. Alternatively, the local feature values excluding the signal distribution with a smaller change in capacitance than in the local distribution are used, making the improvement effect for the estimation accuracy more noticeable.

Modification of Second Embodiment

Although the computation rule for estimating the instruction position or the inclination angle of the electronic pen 14 is changed in the second embodiment, other computation rules may be changed.

Figure 20:
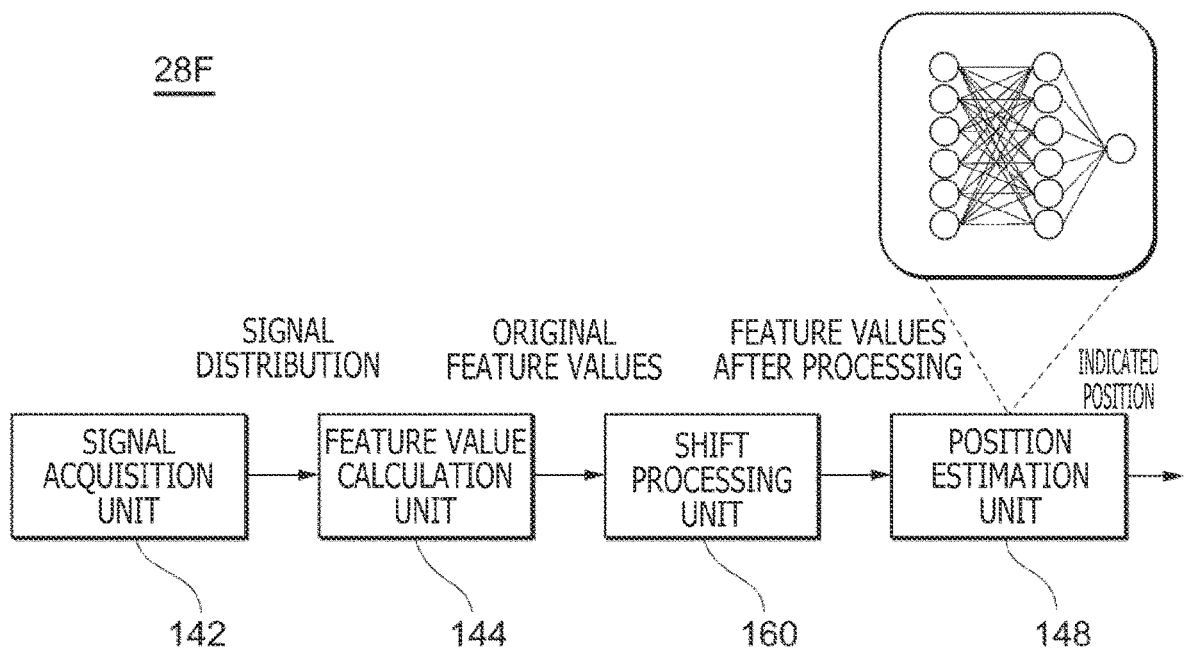
FIG. 20 is a block diagram illustrating a pen detection function according to a modification of the second embodiment.

FIG. 20 is a block diagram illustrating a pen detection function 28F according to a modification of the second embodiment. The pen detection function 28F includes the signal acquisition unit 142, the feature value calculation unit 144, a shift processing unit 160, and the position estimation unit 148. That is, the pen detection function 28F is different from the configuration of the pen detection function 28E of FIG. 16 in that the shift processing unit 160 is provided in place of the computation selection unit 146.

The shift processing unit 160 shifts the positions of the local feature values calculated by the feature value calculation unit 144, as necessary. In terms of function, the shift processing unit 160 does not execute the shift process when there is no missing of local distribution, but the shift processing unit 160 executes the shift process when there is missing of local distribution. Specifically, the shift processing unit 160 specifies a rising position or a falling position of the local distribution from adjacent differences between the local feature values and determines the direction and amount of shift so that both positions fall within a predetermined range. In this way, when part of the local distribution is missing, the addresses of the local feature values are relatively shifted such that the peak center of the local distribution comes closer to the center.

Figure 21A:
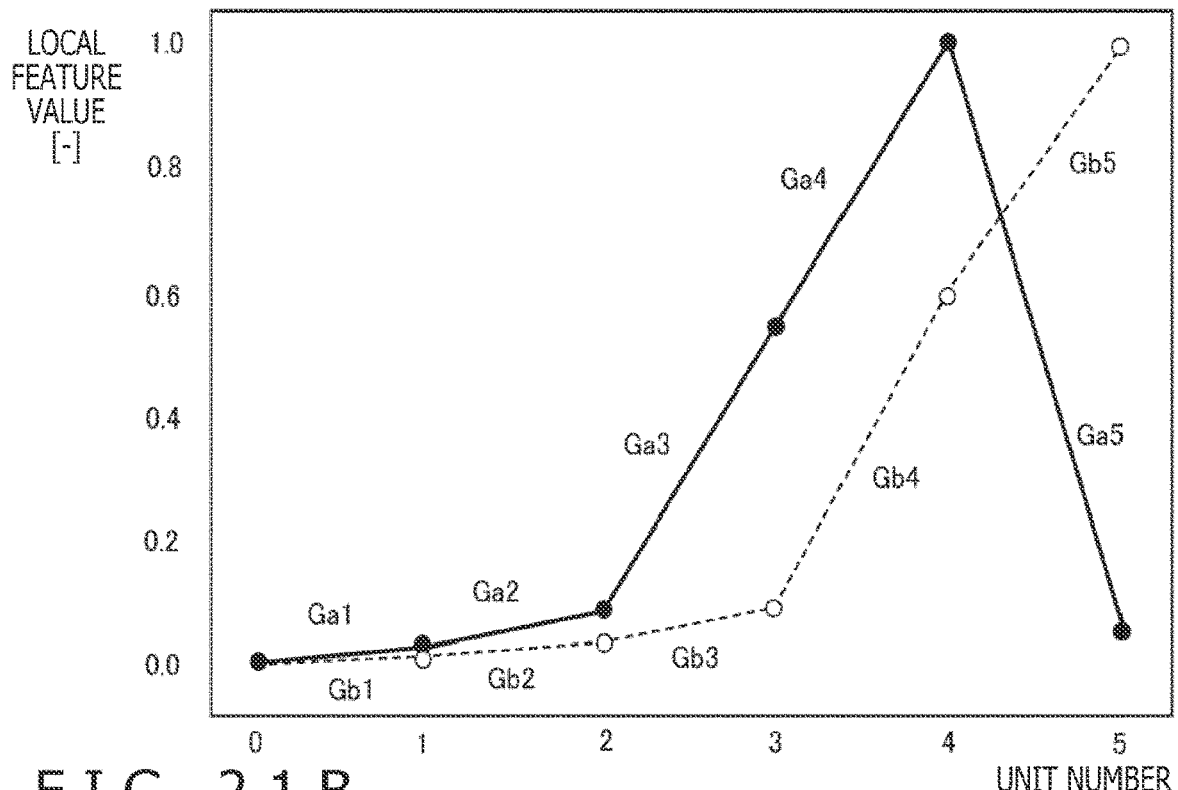
FIG. 21A is a diagram illustrating local feature values before a shift process.
Figure 21B:
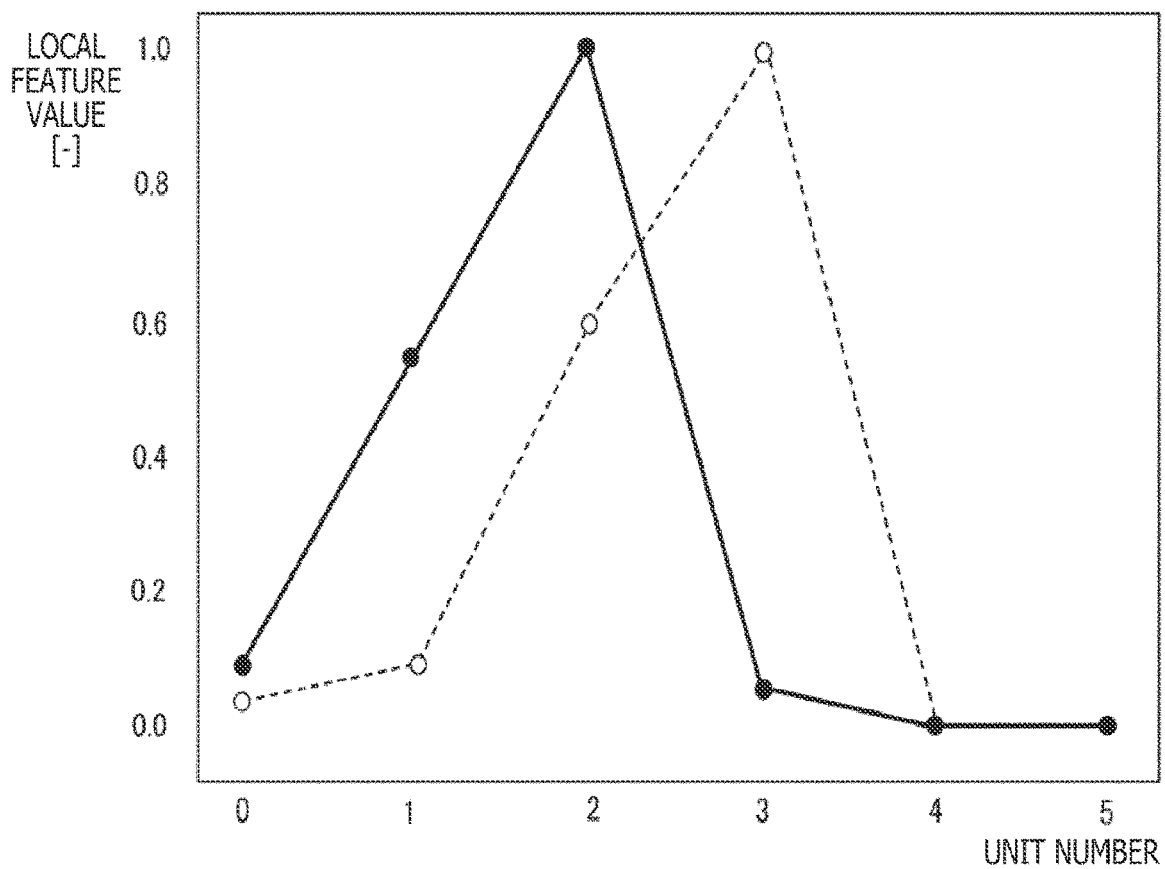
FIG. 21B is a diagram illustrating local feature values after the shift process.

FIG. 21 depicts diagrams illustrating an advantageous effect of the shift process of the local feature values in the peripheral area 152 of FIG. 18. More specifically, FIG. 21A illustrates the local feature values before the shift process, and FIG. 21B illustrates the local feature values after the shift process. In FIG. 21, two polygonal lines (solid line and dashed line) obtained by changing the inclination angles are displayed on top of each other.

The local feature values of FIG. 21A are calculated by using the local distributions with the peak centers at the position of unit number 5. On the other hand, the addresses of the local feature values illustrated in FIG. 21A are shifted by "2" to the negative side to obtain the local feature values of FIG. 21B. Through the shift process, the local feature values are adjusted such that the peak centers of the local distributions come to the position of unit number 3. As a result, the addresses of the local feature values in the peripheral area 152 where there may be missing of local distribution can be brought into line with the addresses of the local feature values in the general area 154 where there is no missing of local distribution. This can easily suppress the reduction in the estimation accuracy for the pen state caused by the relative positional relation between the electronic pen 14 and the touch sensor 18.

In this way, the computation rules may be rules for calculating the local feature values, and the touch IC 140 may estimate the instruction position or the inclination angle from the local feature values calculated by following different rules according to whether or not the projection position of the tip electrode 30 interferes with the periphery of the touch sensor 18. According to the configuration, an effect (that is, an advantageous effect of suppressing the reduction of estimation accuracy) similar to that of the second embodiment can also be obtained.

Third Embodiment

Next, a pen detection function 28G of a touch IC 200 according to a third embodiment will be described with reference to FIGS. 22 to 27.

Configuration and Operation

The basic configuration in the third embodiment is similar to that in the first embodiment (FIGS. 1 to 4), and the description will not be repeated. However, a case in which the electronic pen 14 (FIG. 2) includes only the tip electrode 30 will be illustrated.

Figure 22A:
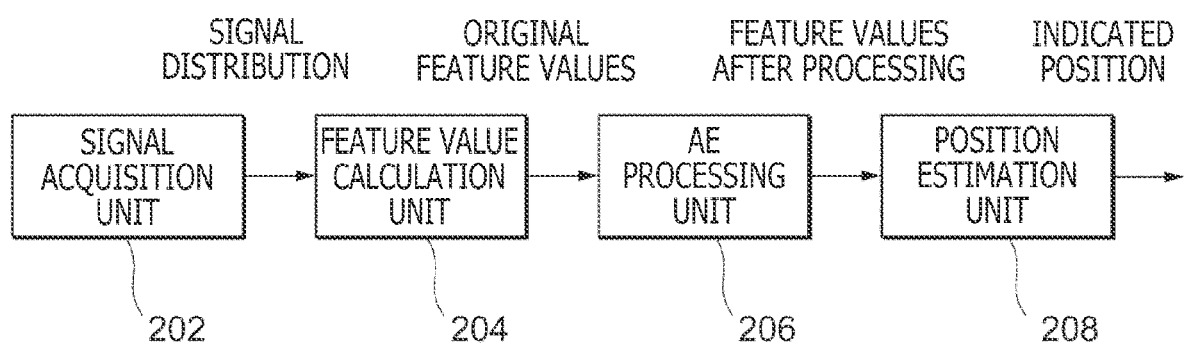
FIG. 22A is a block diagram illustrating a pen detection function according to a third embodiment.
Figure 22B:
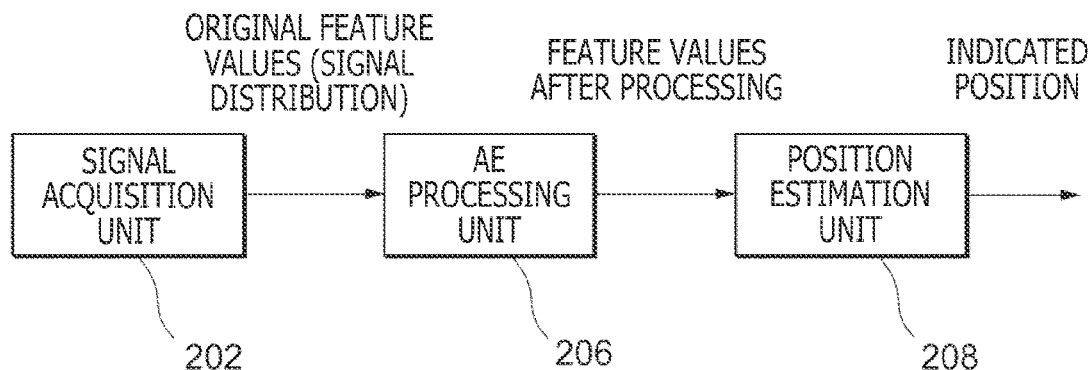
FIG. 22B is a block diagram illustrating an example different from that of FIG. 22A.

FIG. 22A is a block diagram illustrating the pen detection function 28G according to the third embodiment. The pen detection function 28G includes a signal acquisition unit 202, a feature value calculation unit 204, an autoencoding processing unit (hereinafter, AE processing unit 206), and a position estimation unit 208. Alternatively, as illustrated in FIG. 22B, a pen detection function 28H may include the signal acquisition unit 202, the AE processing unit 206, and the position estimation unit 208. Next, an operation of the touch IC 200 associated with execution of the pen detection functions 28G and 28H will be described with reference to a flow chart of FIG. 23.

Figure 23:
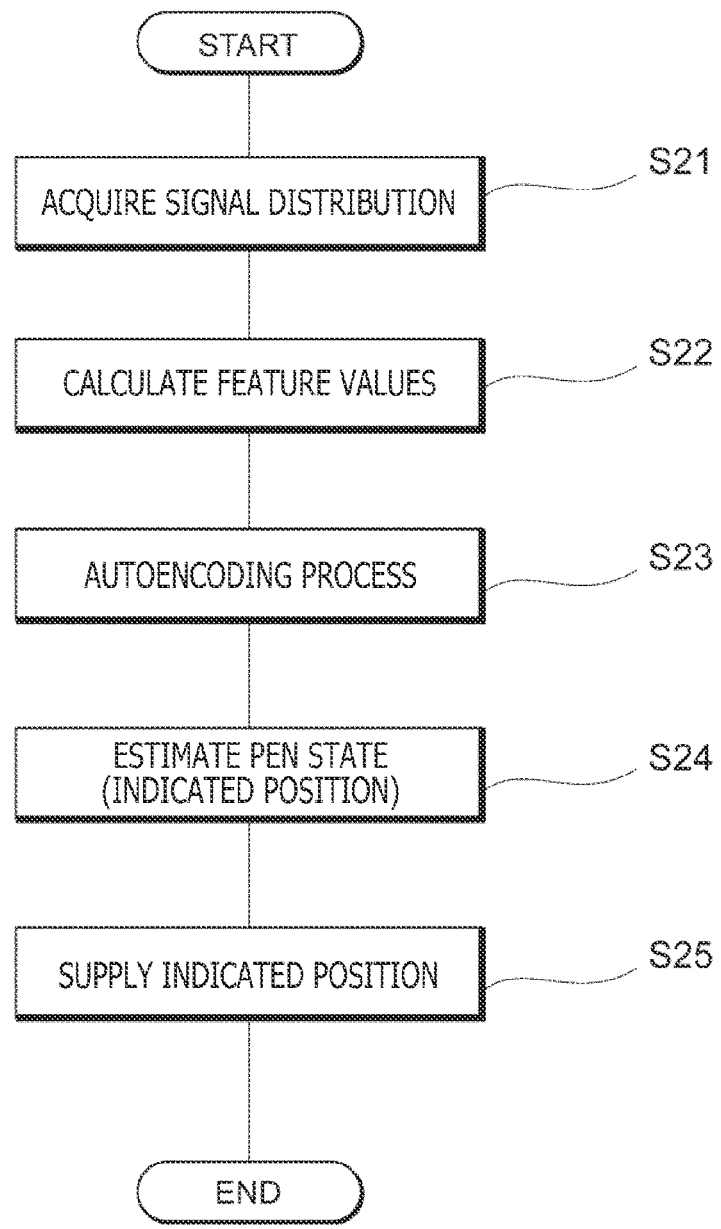
FIG. 23 is a flow chart executed by the pen detection function illustrated in FIG. 22.

In step S21 of FIG. 23, the signal acquisition unit 202 acquires the signal distributions from the touch sensor 18 through the scan operation of each of the line electrodes 18x and 18y. The operation is similar to that in the first embodiment (step S1 of FIG. 6), and the details will not be described.

In step S22, the feature value calculation unit 204 uses the signal distributions acquired in step S21 and calculates the feature values related to the signal distributions. In the case of the configuration illustrated in FIG. 22A, the feature value calculation unit 204 may calculate feature values that are the same as or different from those of the case of the first embodiment (step S2 of FIG. 6). On the other hand, in the case of the configuration illustrated in FIG. 22B, the feature values are the signal distribution itself. For example, in the former case, the feature values related to the entire signal distribution may be used instead of the local feature values.

In step S23, the AE processing unit 206 applies an autoencoding process described later to the feature values calculated in step S22. In step S24, the position estimation unit 208 estimates the instruction position from the feature values to which the autoencoding process is applied in step S23. The autoencoding process and the estimation of the pen state are performed by a machine learning estimator 210.

Figure 24:
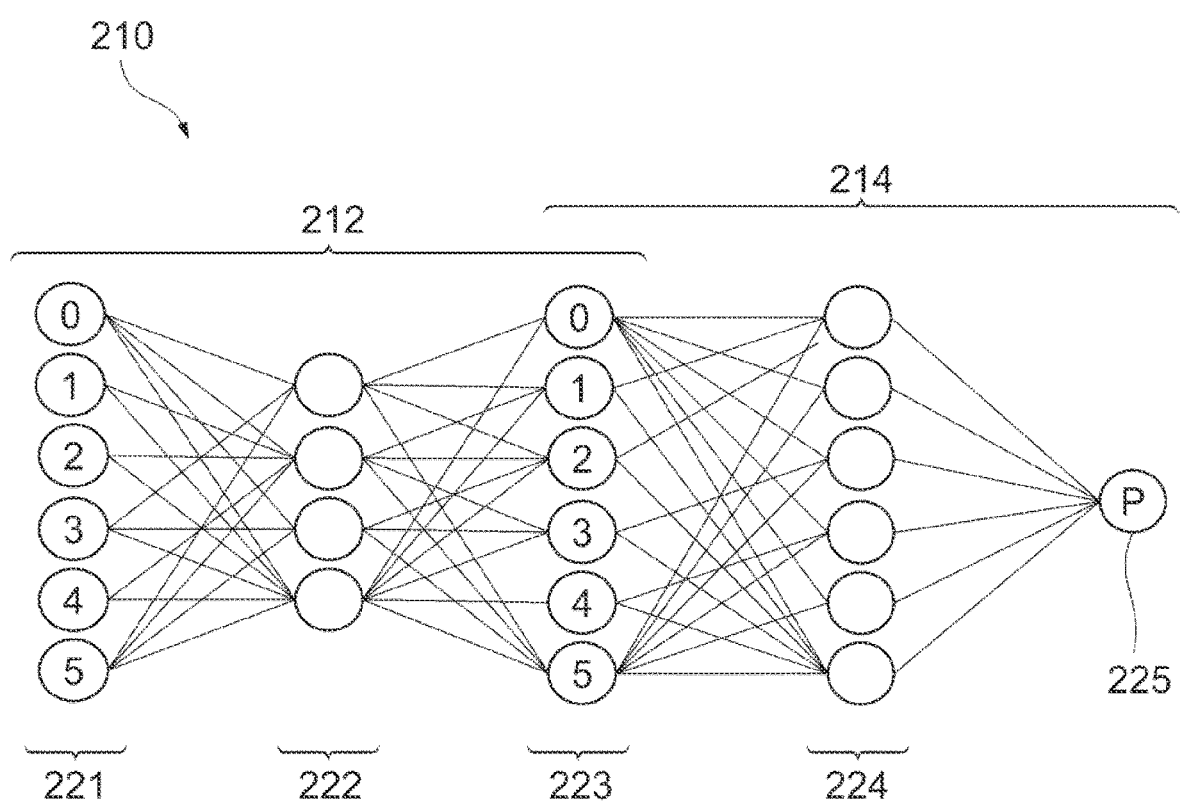
FIG. 24 is a diagram illustrating a configuration of an estimator included in the pen detection function of FIG. 22.

FIG. 24 is a diagram illustrating a configuration of the estimator 210 included in the pen detection functions 28G and 28H of FIG. 22. The estimator 210 includes a former computation element 212 and a latter computation element 214 connected in series. The former computation element 212 corresponds to the AE processing unit 206 illustrated in FIGS. 22A and 22B, and the latter computation element 214 corresponds to the position estimation unit 208 illustrated in FIGS. 22A and 22B. Note that the values of the "feature values" corresponding to the tip electrode 30 are stored in computation units labeled 0 to 5.

The estimator 210 is, for example, a five-layered neural net computation element including a first layer 221, a second layer 222, a third layer 223, a fourth layer 224, and a fifth layer 225. The first layer 221 includes N computation units for inputting the values of the feature values. The second layer 222 includes M (here, M<N) computation units. The third layer 223 includes the same number of (that is, N) computation units as in the configuration of the first layer 221. The fourth layer 224 includes, for example, L (here, L=N) computation units. The fifth layer 225 includes one computation unit for outputting the instruction position.

The former computation element 212 is a hierarchical neural network computation element including the first layer 221 as an input layer, the second layer 222 as a middle layer, and the third layer 223 as an output layer. In the case of this configuration, the first layer 221 and the second layer 222 perform a dimension compression function, and the second layer 222 and the third layer 223 perform a dimension restoration function. A learning parameter group optimized by learning without training is used for the computation process of the former computation element 212.

The latter computation element 214 is a hierarchical neural network computation element including the third layer 223 as an input layer, the fourth layer 224 as a middle layer, and the fifth layer 225 as an output layer. A learning parameter group optimized by learning with training is used for the computation process of the latter computation element 214.

In step S25 of FIG. 23, the pen detection functions 28G and 28H supply data including the instruction position estimated in step S24 to the host processor 22. In this way, the flow chart of FIG. 23 is finished. The touch IC 200 sequentially executes the flow chart at predetermined time intervals to detect the instruction positions according to the movement of the electronic pen 14.

Comparison of Estimation Accuracy

Next, an improvement effect for the estimation accuracy of the machine learning estimator 210 will be described with reference to FIGS. 25 to 27.

Figure 25A:
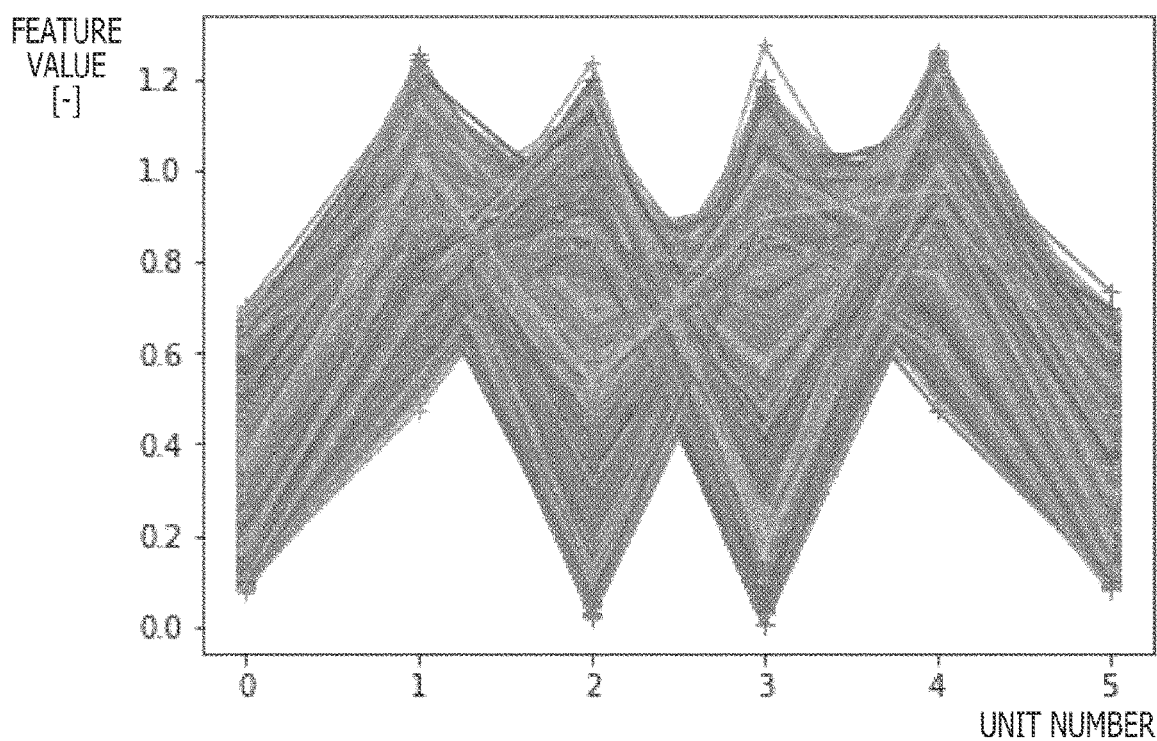
FIGS. 25A and 25B are diagrams illustrating variations of local feature values before execution of an autoencoding process.
Figure 25B:
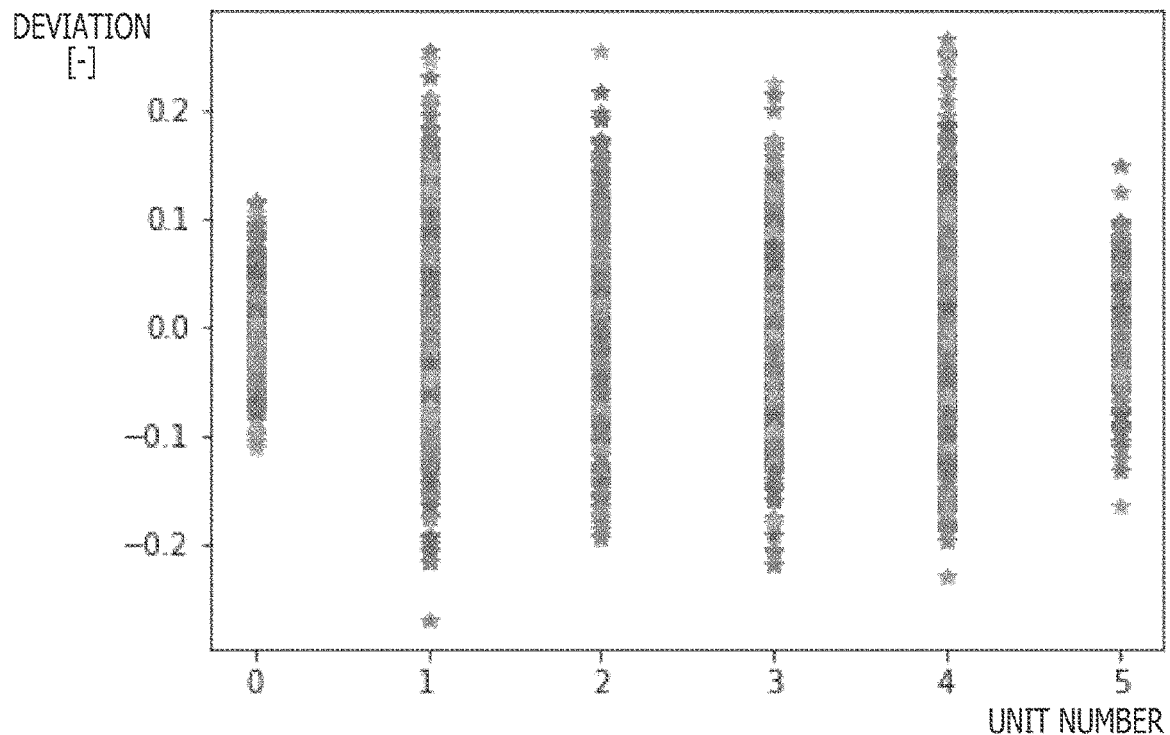

FIG. 25 depicts diagrams illustrating variations of the feature values before the execution of the autoencoding process. More specifically, FIG. 25A is a diagram illustrating a tendency of feature values calculated from various signal distributions. In addition, FIG. 25B illustrates a deviation calculated from populations of the feature values in FIG. 25A. In FIGS. 25A and 25B, a plurality of polygonal lines or plots obtained by changing the inclination angles are displayed on top of each other.

Figure 26A:
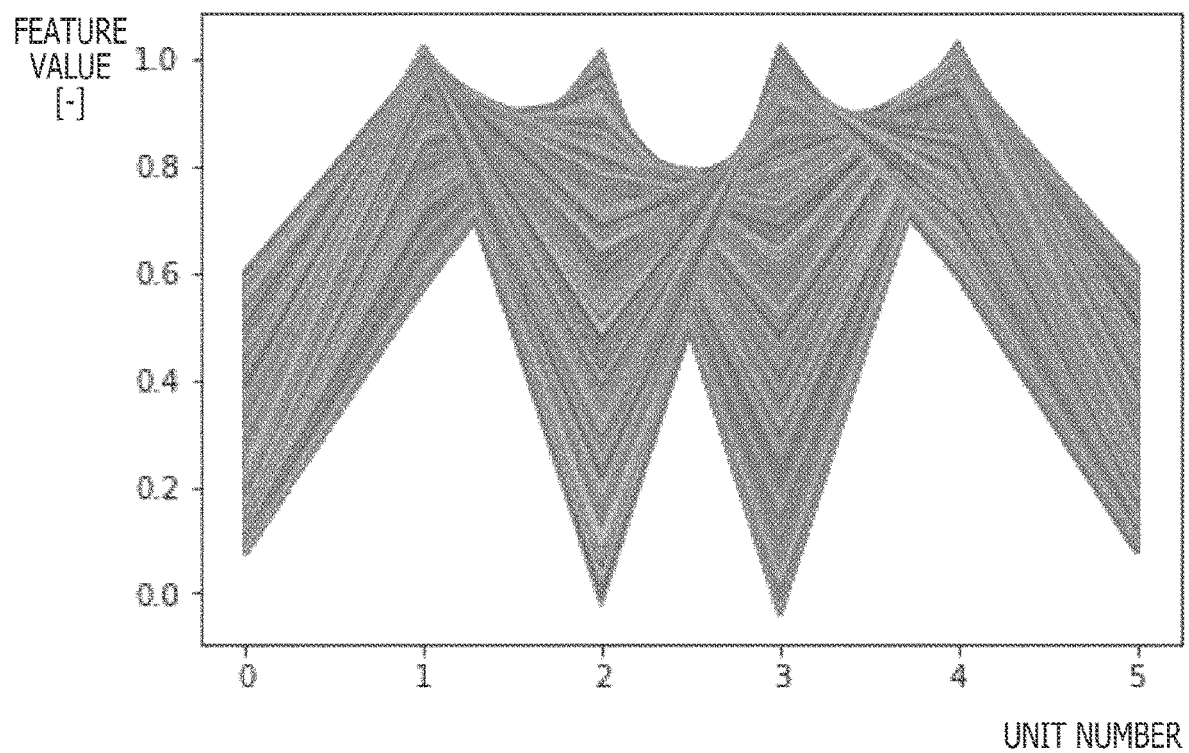
FIGS. 26A and 26B are diagrams illustrating variations of local feature values after the execution of the autoencoding process.
Figure 26B:
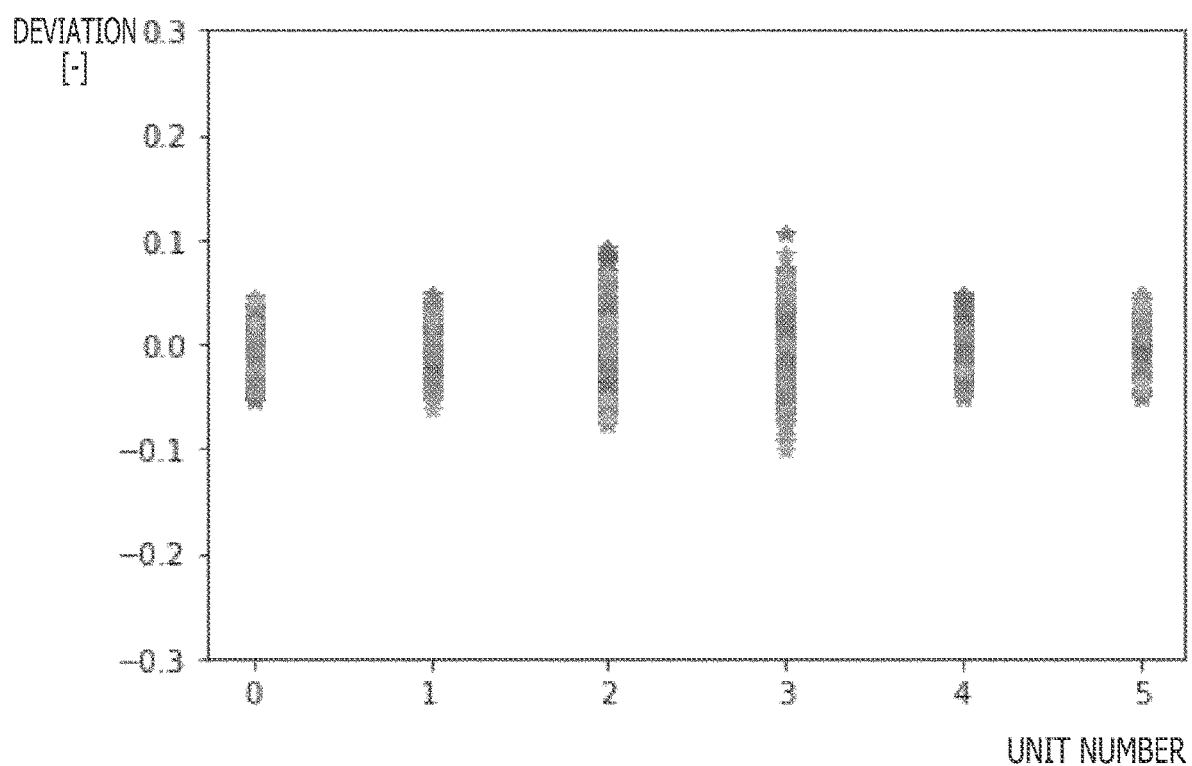

FIG. 26 depicts diagrams illustrating variations of the feature values after the execution of the autoencoding process. More specifically, FIG. 26A is a diagram illustrating results of applying the autoencoding process to the feature values in FIG. 25A. In addition, FIG. 26B illustrates a deviation calculated from populations of the feature values in FIG. 26A. In FIGS. 26A and 26B, a plurality of obtained polygonal lines or plots are displayed on top of each other.

As can be understood from FIGS. 25B and 26B, the deviation (that is, variation) of the feature values is reduced to half or less than half before and after the autoencoding process. That is, an advantageous effect of removing noise components mixed in the feature values is obtained by applying the autoencoding process.

FIG. 27A is a diagram illustrating estimation accuracy for the instruction position in a "reference example." FIG. 27B is a diagram illustrating estimation accuracy for the instruction position in the "embodiments." Here, each instruction position is estimated while the combination of the inclination angle and the amount of added noise is changed, and the relation between the actual value (unit: mm) of the instruction position and the estimation error (unit: μm) is expressed in a scatter diagram. Note that, in this comparison (reference example), only the latter computation element 214 of FIG. 24 is used to estimate the instruction position. It can be understood by comparing the scatter diagrams that the estimation accuracy for the instruction position is improved by applying the autoencoding process to the feature values.

Conclusion of Third Embodiment

As described above, the touch IC 200 is a pen state detection circuit that detects the state of the electronic pen 14 including at least one electrode, on the basis of the signal distribution detected by the capacitance touch sensor 18 including the plurality of sensor electrodes (line electrodes 18x and 18y) arranged in a plane shape. Further, the touch IC 200 (one or a plurality of processors) acquires, from the touch sensor 18, the signal distribution indicating the change in capacitance associated with the approach of the electrode (S21 of FIG. 23) and sequentially applies the dimension compression process and the dimension restoration process to the feature values related to the signal distribution, to thereby execute the autoencoding process of outputting the feature values equal to the number of dimensions of the input (S23). The touch IC 200 estimates the instruction position or the inclination angle of the electronic pen 14 by using the feature values to which the autoencoding process is applied (S24).

In this way, the autoencoding process can be applied to the feature values related to the signal distribution, to remove the noise components included in the feature values, and the estimation accuracy of the instruction position is improved. Particularly, the estimation accuracy of the instruction position is further increased by using the machine learning estimator 210 (more specifically, the latter computation element 214). Note that the feature values may be one of or both the first feature values and the second feature values in the first embodiment.

In addition, the touch IC 200 may use the machine learning estimator 210 to estimate the instruction position or the instruction angle from the feature values to which the autoencoding process is applied. For example, in the first embodiment and this modification, the AE processing unit 206 may be added to at least one section of [1] the input side of the position estimation unit 46 (FIG. 5), [2] the input side of the angle estimation unit 68 (FIG. 5), [3] the input side of the position estimation unit 80 (FIG. 12), [4] the input side of the feature value combining unit 90 (FIGS. 13 and 14), and [5] the input side of the position estimation unit 100 (FIG. 14).

Fourth Embodiment

Next, an input system 250 as a pen state detection system according to a fourth embodiment will be described with reference to FIGS. 28 to 31.

Overall Configuration

FIG. 28 is an overall configuration diagram of the input system 250 as a pen state detection system according to the fourth embodiment. The input system 250 includes one or a plurality of electronic devices 12, one or a plurality of electronic pens 14, and a learning computer 252. Each electronic device 12 can perform two-way communication with the learning computer 252 through a network NW.

The learning computer 252 is a server apparatus that performs a management function of a learning parameter group LP suitable for the electronic pen 14. Specifically, the learning computer 252 includes a communication unit 254, a control unit 256, and a storage unit 258.

The communication unit 254 includes a communication interface that can transmit and receive electrical signals to and from external apparatuses. Thus, the learning computer 252 can transmit, to the electronic device 12, the learning parameter group LP corresponding to the electronic pen 14 according to a request from the electronic device 12.

The control unit 256 may be a general-purpose processor including a CPU or may be a special-purpose processor including a GPU or an FPGA (Field Programmable Gate Array). The control unit 256 reads and executes programs stored in a memory including the storage unit 258, to function as a data processing unit 260, a learning processing unit 262, and a learner 264.

The storage unit 258 includes, for example, a non-transitory storage medium including a hard disk drive (HDD: Hard Disk Drive) and a solid state drive (SSD: Solid State Drive). In the example of FIG. 28, a training data group 266 including a set of training data TD and a database (herein-after, parameter DB 268) related to learning parameters are stored in the storage unit 258.

Functional Block Diagram

Figure 29:
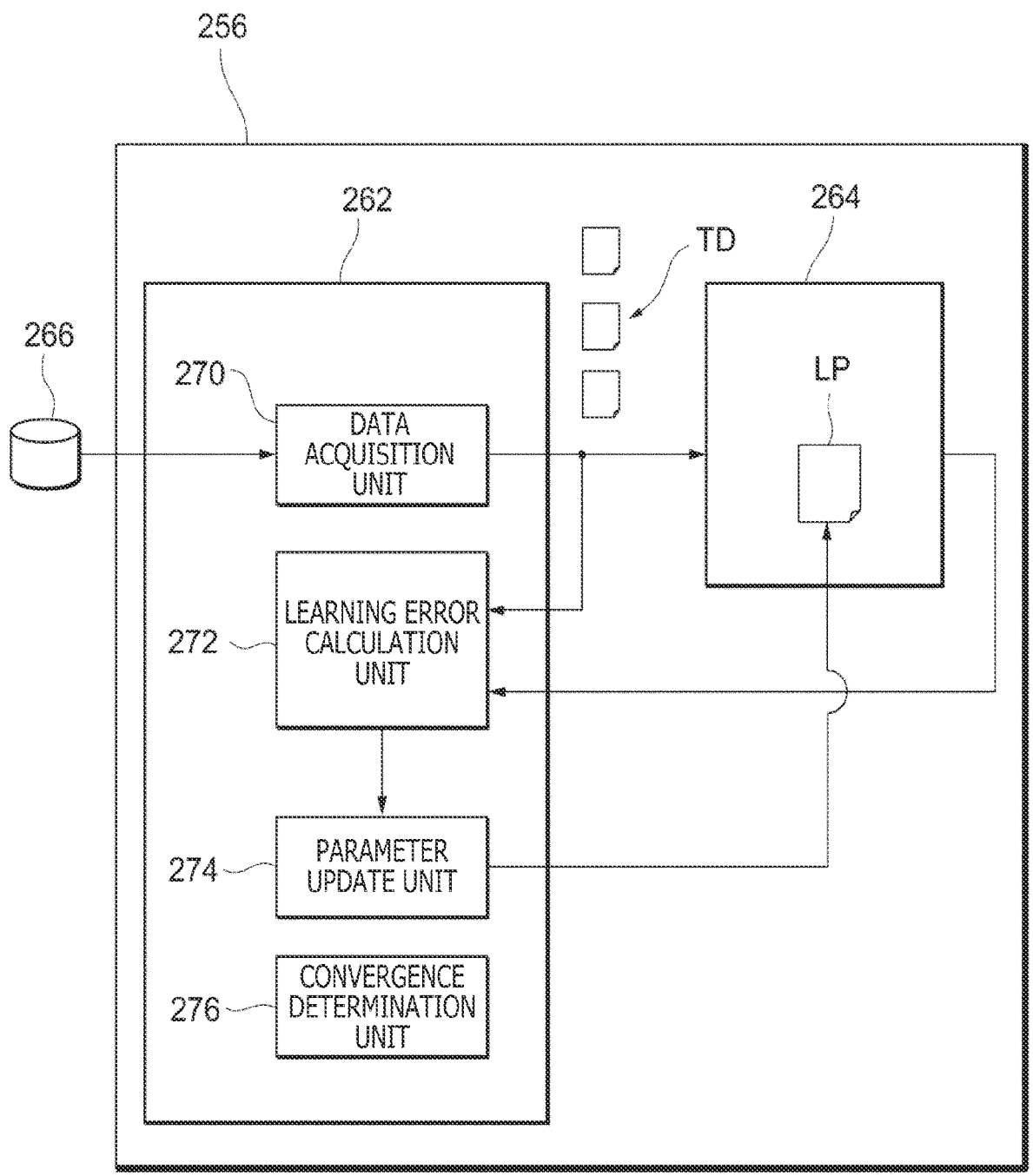
FIG. 29 is a functional block diagram related to a learning process of a control unit illustrated in FIG. 28.

FIG. 29 is a functional block diagram related to a learning process of the control unit 256 illustrated in FIG. 28. The control unit 256 uses the prepared training data TD to execute a learning process for the learner 264 and thereby create one or more types of learning parameter groups LP to be applied to the electronic pen 14. FIG. 29 schematically illustrates the learning processing unit 262 and the learner 264 among the functional units that can be executed by the control unit 256.

The learning processing unit 262 uses a plurality of sets of training data TD to execute the learning process for the learner 264 (in other words, optimization process of learning parameter groups LP). Specifically, the learning processing unit 262 includes a data acquisition unit 270, a learning error calculation unit 272, a parameter update unit 274, and a convergence determination unit 276.

The data acquisition unit 270 acquires one or a plurality of sets of training data TD from the prepared training data group 266. The training data TD includes data sets of input vectors and output values and is obtained by actual measurement or calculation simulation. For example, in the case of "actual measurement," a plurality of positions on the sensor plane may be randomly selected, and the signal distributions at the positions may be measured to create the training data TD. Furthermore, in the case of "calculation simulation," one of a physical simulation including electromagnetic field analysis or electric circuit analysis and a mathematical simulation including a sampling process, an interpolation process, or noise addition may be used to create the training data TD.

The learning error calculation unit 272 calculates an error (hereinafter, referred to as a learning error) between an output value from the learner 284 with respect to the input vector of the training data TD and an output value of the training data TD. The learning error may be an L1-norm function for returning an absolute value of the difference or may be an L2-norm function for returning a square value of the difference. In addition, the learning error may be an error in one set of training data TD (in a case of online learning) or may be an error related to a plurality of sets of training data TD (in a case of batch learning or mini-batch learning).

The parameter update unit 274 updates variable parameters of the learning parameter group LP in order to reduce the learning error calculated by the learning error calculation unit 272. Examples of an update algorithm that can be used include various methods including gradient descent, stochastic gradient descent, momentum method, and RMSprop.

The convergence determination unit 276 determines whether or not a predetermined convergence condition is satisfied at the time of current learning. Examples of the convergence condition include that [1] the learning error is sufficiently reduced, [2] the amount of update of the learning error is sufficiently reduced, and [3] the number of repetitions of learning has reached an upper limit.

Setting Method for Learning Parameter Group LP

Figure 30:
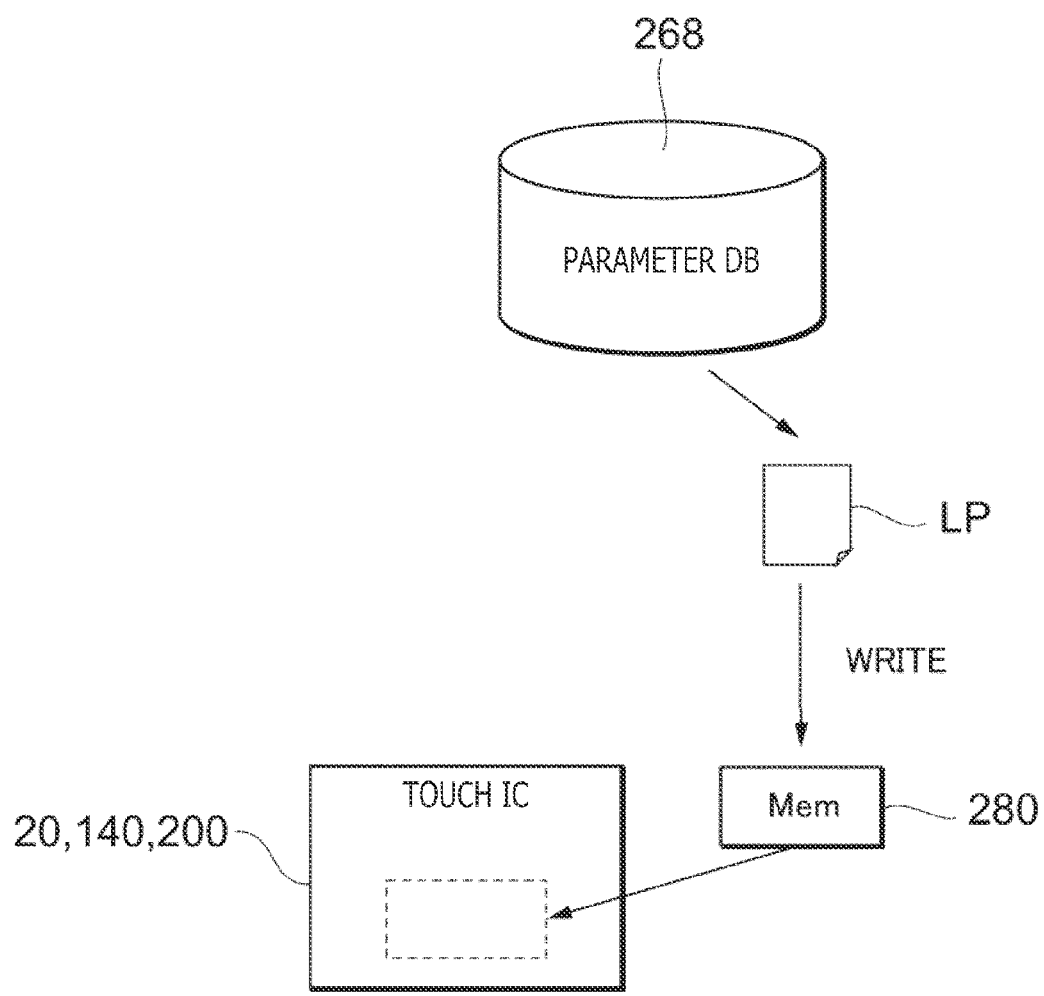
FIG. 30 is a diagram illustrating a first example of a setting method of a learning parameter group.

FIG. 30 is a diagram illustrating a first example of a setting method for the learning parameter group LP. First, the learning computer 252 uses the training data TD related to various types of electronic pens 14 and performs machine learning. Consequently, a typical learning parameter group LP of the electronic pens 14 is generated. Further, a manufacturing worker of the touch IC 20, 140, or 200 performs an operation of writing, to a memory 280, the learning parameter group LP stored in the parameter DB 288. In this way, the touch IC 20, 140, or 200 provided with the memory 280 can fulfill the estimation function of the pen state while the touch IC 20, 140, or 200 is incorporated into the electronic device 12.

FIG. 31 is a diagram illustrating a second example of the setting method for the learning parameter group LP. [1] First, the electronic device 12 attempts to pair with an electronic pen 14 near the electronic device 12. [2] When the pairing is successful and the electronic pen 14 is detected, the electronic device 12 transmits, to the learning computer 252, a request signal including the identification information (that is, pen ID) acquired from the electronic pen 14. [3] The data processing unit 260 of the learning computer 252 searches the parameter DB 268 to acquire the learning parameter group LP corresponding to the pen ID. [4] The learning computer 252 transmits the acquired learning parameter group LP to the electronic device 12 as a transmission source of the request signal. [5] The electronic device 12 sets the learning parameter group LP so that the touch IC 20, 140, or 200 can use the learning parameter group LP. In this way, the touch IC 20, 140, or 200 can fulfill the pen state estimation function.

Conclusion of Fourth Embodiment

In this way, the input system 250 includes the electronic device 12 including the touch IC 20, 140, or 200; the electronic pen 14 used along with the electronic device 12; and the learning computer 252 that can perform two-way communication with the electronic device 12 and that can store the learning parameter group LP of the estimator constructed on the touch IC 20, 140, or 200, the estimator estimating the instruction position or the inclination angle of the electronic pen 14.

Furthermore, when the electronic pen 14 is detected, the electronic device 12 requests the learning computer 252 to transmit the learning parameter group LP corresponding to the electronic pen 14 and holds the learning parameter group LP from the learning computer 252 so that the touch IC 20, 140, or 200 can use the learning parameter group LP. In this way, an estimate suitable for the electronic pen 14 can be made even when the combination of the electronic device 12 and the electronic pen 14 is changed.

DESCRIPTION OF REFERENCE SYMBOLS 10, 250: Input system (pen state detection system)
12: Electronic device
14: Electronic pen
16: Finger
18: Touch sensor
18x, 18y: Line electrode
20, 140, 200: Touch IC (pen state detection circuit)
22: Host processor
28 (A, B, C, D, E, F, G, H): Pen detection function
30: Tip electrode (first electrode)
32: Upper electrode (second electrode)
34: Oscillation circuit
50, 82, 94, 102, 100, 210: Estimator
52, 112, 212: Former computation element
54, 114, 214: Latter computation element
60, 104: Common computation element
61: Switch (first switch)
62: Switch (second switch)
250: Learning computer (server apparatus)
LP: Learning parameter group
TD: Training data The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pen state detection circuit that detects a state of an electronic pen including a first electrode, on a basis of a signal distribution detected by a capacitance touch sensor including a plurality of sensor electrodes arranged in a plane shape,
the pen state detection circuit executing:
an acquisition step of acquiring, from the touch sensor, a first signal distribution indicating a change in capacitance associated with approach of the first electrode, and
an estimation step of using a machine learning estimator to estimate an instruction position or an inclination angle of the electronic pen from first feature values related to the first signal distribution,
wherein
the first feature values include first local feature values related to a first local distribution corresponding to sensor electrodes in a number fewer than the number of arranged sensor electrodes exhibiting the first signal distribution, and
in the estimation step, the instruction position or the inclination angle is estimated by using the machine learning estimator in which different learning parameter groups are set according to whether the electronic pen is in a contact state or a hover state.

2. The pen state detection circuit according to claim 1, wherein the first local feature values include a certain number of pieces of data regardless of the number of arranged sensor electrodes.

3. The pen state detection circuit according to claim 1, wherein
the first feature values further include a reference position of the first local distribution in a sensor coordinate system defined on a detection surface of the touch sensor,
the machine learning estimator is configured to be capable of executing position computation, with a relative position between the reference position and the instruction position as an output value, and
in the estimation step, the relative position is added to the reference position to estimate the instruction position.

4. The pen state detection circuit according to claim 1, wherein
the electronic pen further includes a second electrode different from the first electrode,
in the acquisition step, a second signal distribution indicating a change in capacitance associated with approach of the second electrode is further acquired from the touch sensor,
in the estimation step, the instruction position or the inclination angle is estimated from the first feature values and second feature values related to the second signal distribution, and
the second feature values include second local feature values related to a second local distribution corresponding to sensor electrodes in a number fewer than the number of arranged sensor electrodes exhibiting the second signal distribution.

5. The pen state detection circuit according to claim 4, wherein
the first electrode is a tip electrode that has a shape symmetrical with respect to an axis of the electronic pen and that is provided at a tip of the electronic pen, and
the second electrode is an upper electrode that has a shape symmetrical with respect to the axis of the electronic pen and that is provided on a base end side of the tip electrode.

6. The pen state detection circuit according to claim 5, wherein the machine learning estimator is configured to be capable of sequentially executing:
angle computation with the second local feature values as input values and with the inclination angle as an output value, and
position computation with the first local feature values and the inclination angle as input values and with the relative position as an output value.

7. The pen state detection circuit according to claim 6, wherein the machine learning estimator includes:
a first switch that is capable of switching and outputting one of a learning parameter group for the angle computation and a learning parameter group for the position computation,
a second switch that is capable of switching and outputting one of the input values for the angle computation and the input values for the position computation, and
a common computation element that is capable of selectively executing the angle computation or the position computation according to the switch of the first switch and the second switch.

8. The pen state detection circuit according to claim 4, wherein
the machine learning estimator is configured to be capable of executing position computation with the first local feature values and the second local feature values as input values and with the relative position as an output value.

9. The pen state detection circuit according to claim 4, wherein the machine learning estimator includes:
a combiner that combines the first feature values and the second feature values to output third feature values, and
a computation element that sets the third feature values as input values and sets the instruction position as an output value.

10. The pen state detection circuit according to claim 4, wherein
the first local feature values include feature values indicating tilts of the first local distribution or absolute values of the tilts, and
the second local feature values include feature values indicating tilts of the second local distribution or absolute values of the tilts.

11. The pen state detection circuit according to claim 1, wherein the machine learning is learning with training using training data obtained by actual measurement or calculation simulation.

12. The pen state detection circuit according to claim 1, wherein
the pen state detection circuit further executes a processing step of sequentially applying a dimension compression process and a dimension restoration process to the first feature values to execute an autoencoding process of obtaining first feature values equivalent to the number of dimensions of input, and
in the estimation step, the machine learning estimator is used to estimate the instruction position or the inclination angle from the first feature values to which the autoencoding process is applied.

13. The pen state detection circuit according to claim 1, wherein
in the estimation step, the instruction position or the inclination angle is estimated from the first feature values by following different computation rules according to a projection position of the first electrode on a detection surface of the touch sensor.

14. The pen state detection circuit according to claim 13, wherein
the computation rules are rules for estimating the instruction position or the inclination angle, and
in the estimation step, the instruction position or the inclination angle is estimated by using the machine learning estimator in which different learning parameter groups are set according to whether or not the projection position of the first electrode interferes with a periphery of the touch sensor.

15. The pen state detection circuit according to claim 13, wherein
the computation rules are rules for calculating the first local feature values, and
in the estimation step, the instruction position or the inclination angle is estimated from the first local feature values calculated by following different computation rules according to whether or not the projection position of the first electrode interferes with a periphery of the touch sensor.

16. The pen state detection circuit according to claim 1, which is included in a pen state detection system including:
an electronic device including the pen state detection circuit;
the electronic pen used along with the electronic device; and
a server apparatus that is configured to be capable of performing two-way communication with the electronic device and storing learning parameter groups of the machine learning estimator constructed on the pen state detection circuit, wherein
the electronic device is triggered by detection of the electronic pen, to request the server apparatus to transmit a learning parameter group corresponding to the electronic pen.

17. A pen state detection method of detecting a state of an electronic pen including an electrode, on a basis of a signal distribution detected by a capacitance touch sensor including a plurality of sensor electrodes arranged in a plane shape, the pen state detection method comprising:
- an acquisition step of acquiring, from the touch sensor, a signal distribution indicating a change in capacitance associated with approach of the electrode, and
- an estimation step of using a machine learning estimator to estimate an instruction position of the electronic pen from feature values related to the signal distribution, wherein
- the feature values include local feature values related to a local distribution corresponding to sensor electrodes in a number fewer than the number of arranged sensor electrodes exhibiting the signal distribution, and
- in the estimation step, the instruction position or the inclination angle is estimated by using the machine learning estimator in which different learning parameter groups are set according to whether the electronic pen is in a contact state or a hover state.

18. The pen state detection method according to claim 17, wherein
- the estimation step includes following different computation rules according to a projection position of the electrode on a detection surface of the touch sensor.

* * * * *